(12) United States Patent
Shimamura

(10) Patent No.: US 11,054,885 B2
(45) Date of Patent: Jul. 6, 2021

(54) POWER SUPPLY APPARATUS

(71) Applicant: Brother Kogyo Kabushiki Kaisha, Nagoya (JP)

(72) Inventor: Yasuhiro Shimamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 474 days.

(21) Appl. No.: 15/936,660

(22) Filed: Mar. 27, 2018

(65) Prior Publication Data

US 2018/0284865 A1    Oct. 4, 2018

(30) Foreign Application Priority Data

Mar. 28, 2017 (JP) .............................. JP2017-063112

(51) Int. Cl.
| | |
|---|---|
| G06F 1/3234 | (2019.01) |
| G06F 1/3287 | (2019.01) |
| G06F 1/26 | (2006.01) |
| H04N 1/00 | (2006.01) |
| G06F 3/12 | (2006.01) |

(52) U.S. Cl.
CPC .............. G06F 1/325 (2013.01); G06F 1/266 (2013.01); G06F 1/3287 (2013.01); G06F 3/1221 (2013.01); G06F 3/1229 (2013.01); G06F 3/1279 (2013.01); H04N 1/00411 (2013.01);
(Continued)

(58) Field of Classification Search
CPC ...... G06F 1/266; G06F 3/1221; G06F 3/1229; G06F 1/325; G06F 1/3287; G06F 3/1279; H04N 1/00411; H04N 1/00904; H04N 1/00888; H04N 1/00954
See application file for complete search history.

(56) References Cited

U.S. PATENT DOCUMENTS

| | | | | | |
|---|---|---|---|---|---|
| 6,064,554 | A | * | 5/2000 | Kim | ........................ G06F 1/266 |
| | | | | | 361/64 |
| 10,110,046 | B1 | * | 10/2018 | Esquibel | ................. H02J 7/025 |

(Continued)

FOREIGN PATENT DOCUMENTS

| | | |
|---|---|---|
| JP | 2006-236532 A | 9/2006 |
| JP | 2007-72907 A | 3/2007 |

(Continued)

OTHER PUBLICATIONS

Feb. 2, 2021—(JP) Notice of Reasons for Refusal—App 2017-063112, Eng. Tran., pp. 1-14.

*Primary Examiner* — Jaweed A Abbaszadeh
*Assistant Examiner* — Brian J Corcoran
(74) *Attorney, Agent, or Firm* — Banner & Witcoff, Ltd.

(57) ABSTRACT

A computing device, such as a multifunction printer, may be configured to supply electrical power to one or more external devices. The computing device may include a user interface that can display information to a user, informing the user of the electrical power being supplied to the one or more external devices and/or of the total amount of electrical power that is available to the one or more external devices. The user may use the user interface to adjust the amount of power being supplied to each of the external devices, and the computing device may store information indicating the user's adjusted power levels and use the stored information to control the amount of power supplied to the external devices.

12 Claims, 15 Drawing Sheets

(52) U.S. Cl.
CPC ..... *H04N 1/00888* (2013.01); *H04N 1/00904* (2013.01); *H04N 1/00954* (2013.01)

(56) References Cited

U.S. PATENT DOCUMENTS

| | | | |
|---|---|---|---|
| 2006/0117195 A1* | 6/2006 | Niwa | G06F 1/266 713/300 |
| 2006/0179335 A1 | 8/2006 | Jang | |
| 2007/0055805 A1 | 3/2007 | Hayashi et al. | |
| 2010/0280676 A1* | 11/2010 | Pabon | G06F 1/266 700/295 |
| 2014/0336838 A1* | 11/2014 | Yon | G01R 21/133 700/297 |
| 2016/0336745 A1* | 11/2016 | Pandya | G06F 1/305 |

FOREIGN PATENT DOCUMENTS

| | | |
|---|---|---|
| JP | 2015-88036 A | 5/2015 |
| JP | 2015-174373 A | 10/2015 |
| JP | 2015-174374 A | 10/2015 |
| NO | 2005/022369 A1 | 3/2005 |

\* cited by examiner

POWER SUPPLY APPARATUS

CROSS-REFERENCE TO RELATED APPLICATION

This application claims priority from Japanese Patent Application No. 2017-063112 filed on Mar. 28, 2017, the content of which is incorporated herein by reference in its entirety.

FIELD OF DISCLOSURE

The disclosure relates to a power supply apparatus configured to supply or provide power to an external device through an interface.

BACKGROUND

There is a known power management technique for managing power consumption by a power supply apparatus, such as an image forming apparatus. The image forming apparatus is configured to supply or provide power to an external device over a connection that complies with a predetermined specification, e.g., Universal Serial Bus ("USB") specification. For example, the USB2.0 specification allows for the delivery of powers up to 2.5 W. A newer specification, termed USB power delivery ("USB PD"), allows for the delivery of powers ranging up to 100 W.

SUMMARY

One or more aspects of the disclosure provide a power supply apparatus that provides a user of the power supply apparatus with a representation of a resource of power that can be supplied to one or more external devices through an interface. The power supply apparatus may allow the user to view and change a value of power to be supplied to an external device.

According to one or more aspects of the disclosure, an apparatus, such as a multifunction printer or other computing device, may have a connector that allows connections to one or more external devices, and the connector may supply power to the one or more external devices. The apparatus may have a user interface, which may include a display panel that can display a representation, such as a bar graph, showing a maximum power that can be supplied via the connector to the one or more external devices. A user may view this representation, and supply an input to the user interface (e.g., via buttons, or touch input to a touch-sensitive display associated with the user interface) to choose an amount of power to be supplied to a particular external device via the connector. Based on this user-selected power value, the apparatus may store an external device power value, and may use it to determine how much power to supply to the particular external device via the connector.

A controller controlling a display device to display a representation of the maximum power may allow for a change in an allocation of a power resource (subject to the maximum power) to one or more external devices, e.g., allow for a change in an external device power value that indicates power to be supplied to an external device. By viewing the displayed representation, a user of the apparatus may understand how much power can be supplied to the one or more external devices connected to the interface, and may change a value of power to be supplied to an external device. The user may allocate all or some of the power resource (subject to the maximum power) to the one or more external devices. The USB-PD specification, which allows bidirectional flow of power ranging up to 100 W, allows a device, such as a printer located in an office, to be used as a power supply source for peripheral devices (e.g., external devices).

The apparatus according to one or more aspects of the disclosure may be used to provide a user of the apparatus with a representation of the power resource, and may allow for the user to allocate the power resource to one or more peripheral devices.

The apparatus according to one or more aspects of the disclosure provides a user of the apparatus with a representation of a resource of power that can be supplied to one or more external devices through an interface. The apparatus may allow the user to change a resource allocation or values of power supplied to the external devices.

DETAILED DESCRIPTION

Figure 1:
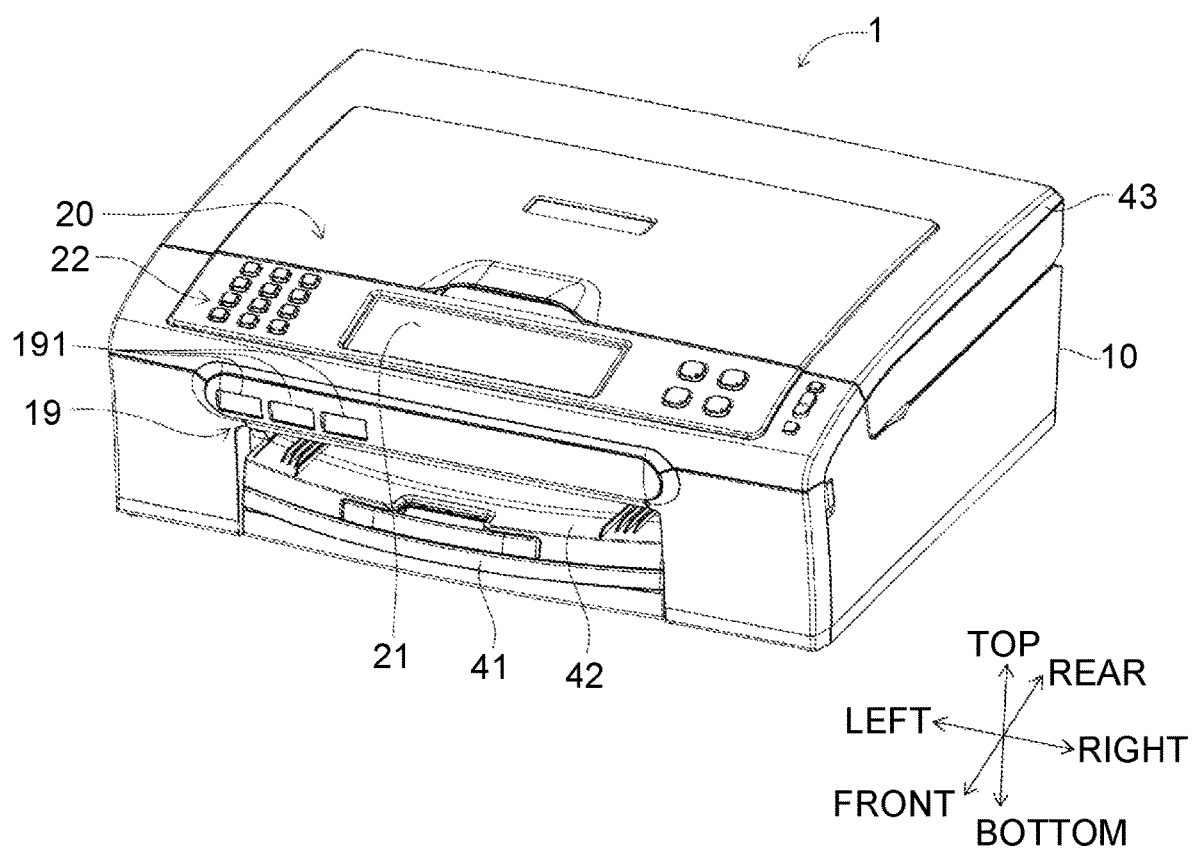
FIG. 1 is a perspective view of a multi-function peripheral ("MFP") in an illustrative embodiment according to one or more aspects of the disclosure.
Figure 2:
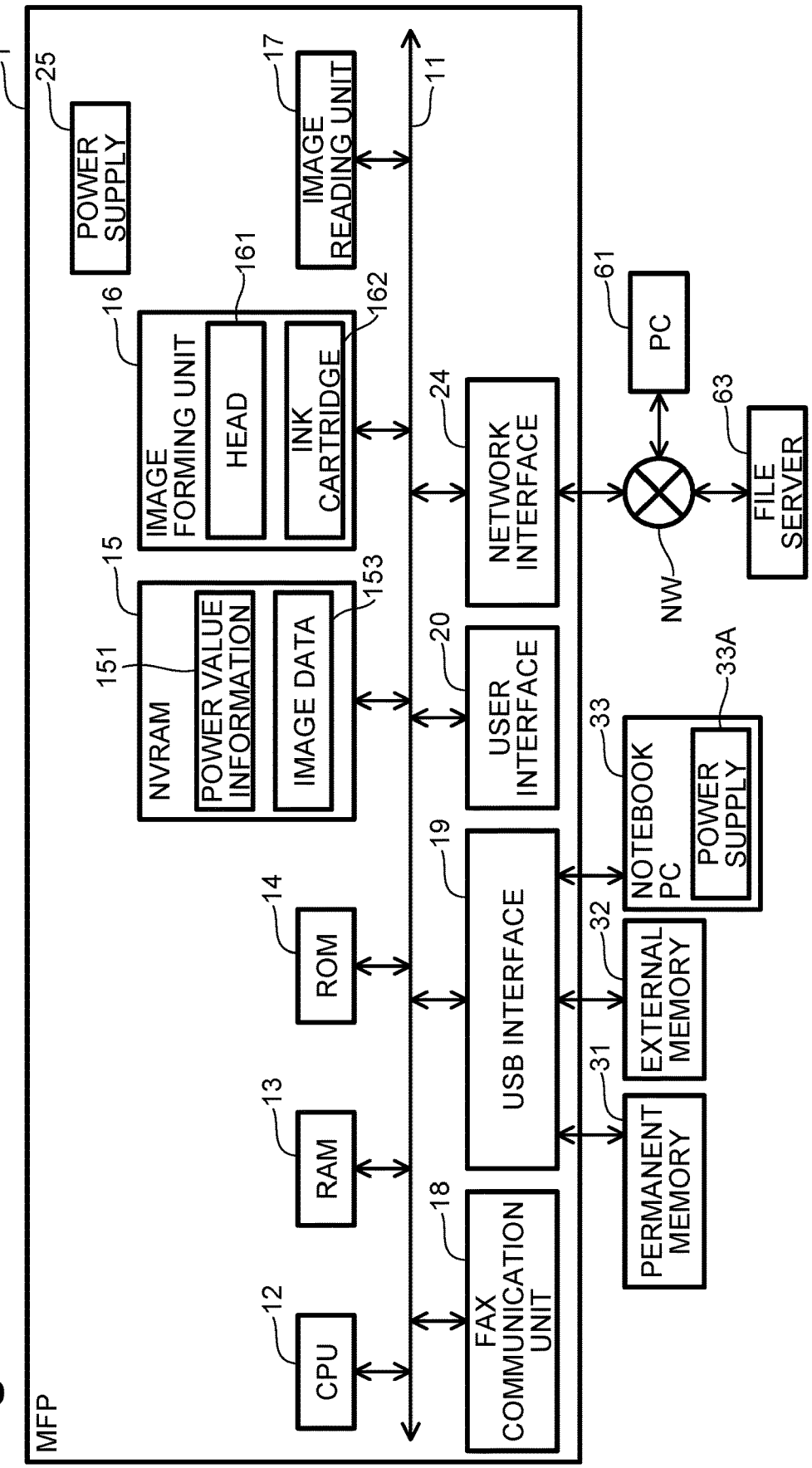
FIG. 2 is a block diagram depicting an electrical configuration of the MFP according to one or more aspects of the disclosure.

Referring to FIGS. 1 and 2, a power supply apparatus, e.g., a multi-function peripheral ("MFP") 1, in an illustrative embodiment will now be described.

(Configuration of MFP)

FIG. 1 is a perspective view of the MFP 1 in an illustrative embodiment. The MFP 1 is a multifunction device having some functions, such as a print function, a copy function, a scanner function, and a facsimile ("fax") function. As depicted in FIG. 1, the MFP 1 includes a casing 10, a Universal Serial Bus ("USB") interface 19, a user interface 20, a feed tray 41, a discharge tray 42, and an upper cover 43. Components of the MFP 1 may be described using directional terminology, such as "upper/top," "lower/bottom," "front," "rear," "left," "right," etc., as labelled in the drawings. Because the disclosed components can be positioned in a number of different orientations, the directional terminology is used for purposes of illustration and is in no way limiting.

The casing 10 has a generally box shape. The casing 10 houses components and units therein, such as a CPU 12, a nonvolatile memory ("NVRAM") 15, and an image forming unit 16 (refer to FIG. 2). The user interface 20 is located at a front portion of an upper surface of the casing 10. The user interface 20 includes a touch panel 21, and operation buttons, e.g., numeral keys 22. The USB interface 19 is located at an upper portion of a front surface of the casing 10. The USB interface 19 includes, for example, three receptacle connectors 191 conforming to Universal Serial Bus (USB) specifications. The feed tray 41 is located at a lower portion of the casing 10. The feed tray 41 is configured to hold sheets (e.g., paper sheets and transparent sheets). A user may pull the feed tray 41 toward the front to load sheets into the feed tray 41. The discharge tray 42 is located above the feed tray 41. The discharge tray 42 is configured to support a sheet having an image formed thereon. The upper cover 43 includes a pivot pin (not depicted) at a rear portion thereof. The upper cover 43 is configured to pivot about the pivot pin. A document glass is located below the upper cover 43. A user may pivot the upper cover 43 upward to reveal the document glass. The user may place a document on the document glass before causing an image reading unit 17 (refer to FIG. 2) to read or scan the document.

Referring to FIG. 2, an electrical configuration of the MFP 1 is described. The MFP 1 includes the CPU 12, a RAM 13, a ROM 14, the NVRAM 15, the image forming unit 16, the image reading unit 17, a fax communication unit 18, the USB interface 19, the user interface 20, and a network interface 24, which are interconnected by a bus 11. The MFP 1 further includes a power supply 25 configured to provide power from a main electricity source to components of the MFP 1 and an external device connected to the MFP 1 through the USB interface 10. The power supply 25 includes a power supply cord and power supply circuitry (e.g., a diode bridge and a smoothing circuit). The power supply 25 generates DC power from the main electricity source, and supplies the power to components of the MFP 1 via power supply lines.

The ROM 14 stores programs. The CPU 12 is configured to execute programs read from the ROM 14, thereby controlling various components of the MFP 1 connected via the bus 11. During the execution of the programs, the CPU 12 may temporarily store results of processing in the RAM 13.

The NVRAM 15 is configured to store therein power value information 151 and image data 153. The power value information 151 includes information representing a maximum power that can be supplied to external devices via the connector (e.g. maximum suppliable power value) and power profile that are described in detail below. The image data 153 may include image data received from an external device for printing, and image data resulting from reading a document, for example, with the copy function or the fax function.

The image forming unit 16 includes a head 161 and an ink cartridge 162. The ink cartridge 162 may hold ink. The image forming unit 16 is configured to print an image on a sheet, under the control of the CPU 12. The image forming unit 16 uses, but is not limited to, an inkjet method in which the head 161 ejects ink, which is supplied from the ink cartridge 162, onto a sheet. The image reading unit 17 includes the document glass and a contact image sensor ("CIS"), which are not depicted. The image reading unit 17 is configured to read a document placed on the document glass with the moving CIS, and to generate image data 153.

The fax communication unit 18 is configured to send and receive facsimile data to and from another facsimile machine via a telephone line. The USB interface 19 allows for data reading from and data writing into an external device connected to the receptacle connector 191 (refer to FIG. 1). The external device connected to the receptacle connector 191 may be, for example, a USB flash drive or USB memory storage device. For example, in the illustrative embodiment, two USB receptacle connectors 191 are connected with USB flash drives. One of the USB flash drives is used as a permanent memory 31, and the other is used as an external memory 32. The permanent memory 31 provides spare memory area for, for example, the fax function and the copy function. When an available space in the NVRAM 15 is less than a predetermined value, image data 153 may be stored in the permanent memory 31. The external memory 32 may be used, for example, individually by respective users. The users may attach or detach the external memory 32 to and from the receptacle connector 191. Neither the permanent memory 31 nor the external memory 32 includes a power supply. Each of the permanent memory 31 and the external memory 32 operates with power supplied from the MFP 1 (e.g., the power supply 25) via a respective receptacle connector 191.

The remaining one of the three receptacle connectors 191 of the USB interface 19 is connected with a notebook or laptop computer ("notebook PC") 33. The notebook PC 33 includes a power supply 33A. The power supply 33A includes, for example, a device for receiving power (e.g., an AC adapter and power supply circuitry) from the main electricity source, and a battery that stores supplied power. For example, the notebook PC 33 may operate with the built-in power supply 33A, and charge its battery with power from the MFP 1.

The user interface 20 is configured to display, for example, setting screens and operational conditions of the MFP 1, in the touch panel 21 (refer to FIG. 1) and under control of the CPU 12. The user interface 20 is configured to receive an operation made using the touch panel 21 and the numeral keys 22 (refer to FIG. 1) and transmit the received operation as a signal to the CPU 12. The network interface 24 is, for example, a local area network LAN ("LAN") interface, and is connected to a network (NW) via a LAN cable (not depicted). In the illustrative embodiment, for example, a PC 61 and a file server 63, are connected to the network NW. For example, a user may operate the PC 61 to provide a print instruction to the MFP 1 and send image data 153 to the MFP 1. The image forming unit 16 is configured to print or form an image based on image data 153. The MFP 1 is configured to upload and download image data 153 to and from the file server 63.

(Power Value Setting Processing)

Figure 3:
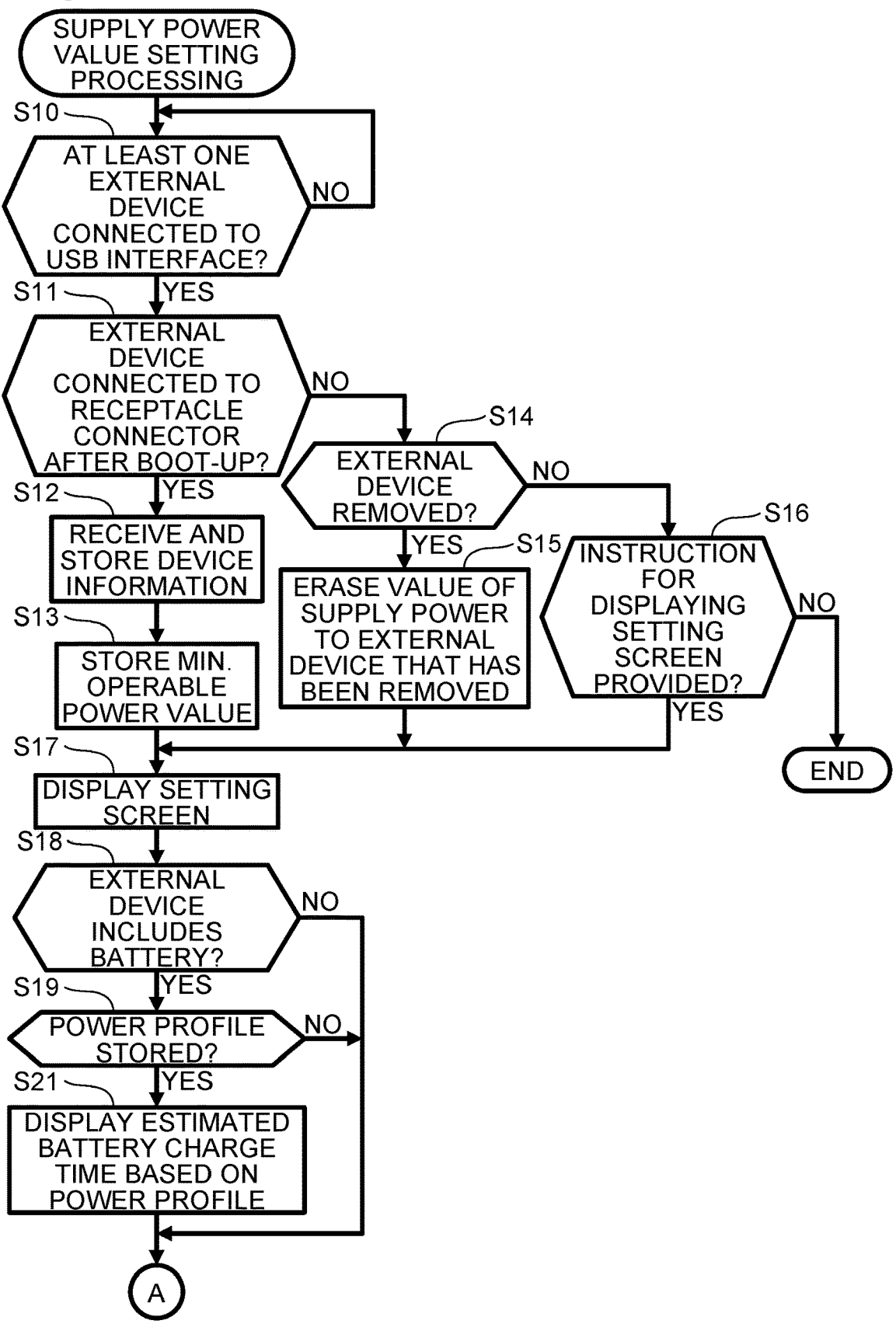
FIG. 3 is a flowchart depicting power value setting processing according to one or more aspects of the disclosure.
Figure 4:
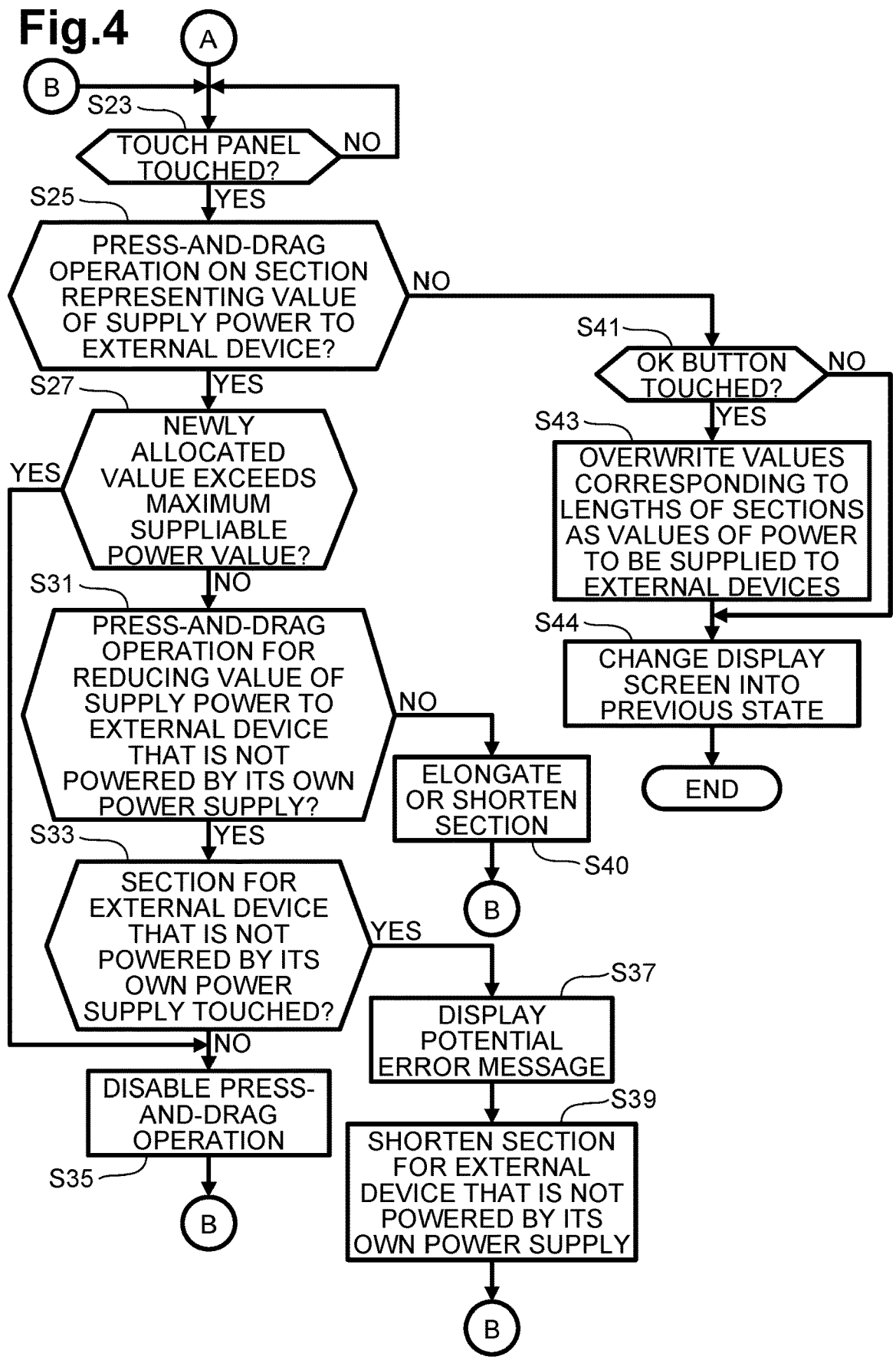
FIG. 4 is a flowchart depicting the power value setting processing according to one or more aspects of the disclosure.

Referring to FIGS. 3 and 4, power value setting processing for setting a value of power to be supplied to an external device (e.g., an external device power value) will now be described. For example, the CPU 12 of the MFP 1 may execute programs stored in the ROM 14 at boot-up or start-up of the MFP 1, so that the processing depicted in FIGS. 3 and 4 may be repeatedly executed.

At step S10 (which may be simply referred to as "S10" as will other steps) in FIG. 3, the CPU 12 determines whether at least one external device is connected to the USB interface 19. Each receptacle connector 191 of the USB interface 19 is configured to output a signal of a first level when an external device is connected to the receptacle connector 191, and a signal of a second level when no external device is connected to the receptacle connector 191. The second level is different from the first level. A signal of the first or second level is input to the CPU 12 via the bus 11. The CPU 12 determines that an external device is connected to the USB interface 19 by determining that a level of a signal input from the receptacle connector 191 via the bus is the first level. Step S10 may be repeated until an external device is connected to the USB interface 19 (S10: NO). After boot-up of the MFP 1, the CPU 12 constantly determines whether an external device is connected to the USB interface 19.

In response to determining that at least one external device is connected to the USB interface 19 (S10: YES), the CPU 12 determines whether any of the at least one external device is connected to the USB interface 19 after boot-up of the MFP 1. The CPU 1 determines that any of the external device(s) is connected to the USB interface 19 after boot-up of the MFP 1 (S11), by determining that a level of a single, which is input from a respective one of the receptacle connectors 191 via the bus 11, is changed from the second level to the first level after boot-up of the MFP 1.

At S11, in response to determining that an external device (e.g., a USB flash drive) is connected to the receptacle connector 191 after boot-up of the MFP 1 (S11: YES), the CPU 12 controls or causes the USB interface 19 to send a command requesting the external device, which is connected to the receptacle connector 191 after boot-up of the MFP 1, to send its device information with Plug-and-Play (PnP) function. The CPU 12 causes the USB interface 19 to receive the device information from the external device (S12). The device information is information for performing communication in accordance with the USB specifications and includes, for example, a manufacturer/vendor identifier ("ID"), a product ID, and a USB device class ID of the external device. The device information further includes information indicating a minimum operable power value and a presence or absence of a battery. The information indicating a minimum operable power value represents a value of minimum operable power necessary to operate or drive the external device connected to the receptacle connector 191. The information indicating a presence or absence of a battery indicates that the external device connected to the receptacle connector 191 does, or does not, have a battery. The CPU 12 stores the device information received by the USB interface 19, for example, in the RAM 13. Every time an external device is connected to the USB interface 19 after boot-up of the MFP 1, the CPU 12 stores the device information of the external device, for example, in the RAM 13. The CPU 12 writes, into a predetermined area of the RAM 13, the minimum operable power value in the device information, which is stored in the RAM 13, as a value of power to be supplied to the external device that is connected to the USB interface 19 after boot-up of the MFP 1 (S13).

In response to determining that no external device is connected to the receptacle connector 191 after boot-up of the MFP 1 (S11: NO), the CPU 12 determines whether any external device is removed from the receptacle connector 191 after boot-up of the MFP 1 (S14). In response to determining that an external device is removed from the receptacle connector 191 after boot-up of the MFP 1 (S14: YES), the CPU 12 erases, from the predetermined area of the RAM 13, the value of power that was to be supplied to the external device that has been removed (S15).

In response to determining that no external device is removed from the receptacle connector 191 after boot-up of the MFP 1 (S14: NO), the CPU 12 determines whether an instruction or operation for displaying a setting screen has been received via the touch panel 21 (S16). The setting screen is for setting a value of power to be supplied to an external device. In response to determining that no instruction or operation for displaying the setting screen has been received (S16: NO), the CPU 12 ends the power value setting processing.

The CPU 12 controls the touch panel 21 to display the setting screen (S17) in one of the following three cases: (1) after an external device has been inserted into USB interface 19, and the device information (including a minimum operable power value) of the external device has been stored in the predetermined area of the RAM 13; (2) after an external device has been removed from the receptacle connector 191 (S15) and the value of power that was supplied to the removed external device has been erased from the predetermined area of the RAM 13; and (3) in response to receiving an instruction to display the setting screen on the touch panel 21 (S16: YES). In one example, the CPU 12 controls the touch panel 21 to display representations of maximum suppliable power values of the MFP 1 in a standby mode and a printing mode, as well as representations of power allocation or values of power to be supplied (or values of supply powers) to one or more external devices in the standby mode and the printing mode. The printing mode may refer to a period in which the MFP 1 receives and processes a print instruction, and a period from, for example, the reception of a print instruction at S51 in FIG. 5 to the completion of printing at S55 in FIG. 5. The steps S51 and S55 will be described in more detail below. The standby mode may refer to a period after boot-up of the MFP 1 but before the reception of a print instruction at S51, and a period after the completion of printing at S55 but before the reception of another print instruction at S51. In other words, the standby mode may refer to a period in which the MFP 1 is not receiving or executing a print instruction.

The maximum suppliable power value may refer to a value of the maximum power that the MFP 1 can provide or supply, via the USB interface 19, to the one or more external devices. The maximum suppliable power value in the printing mode is lower than that in the standby mode, because more power is consumed in the printing mode, in which the image forming unit 16 is driven, than the standby mode, in which the image forming unit 16 is not driven. The maximum suppliable power values in the printing and standby modes, are stored in, for example, the NVRAM 15, as the power value information 151.

A value of power to be supplied to an external device refers to a value of power to be actually supplied by the MFP 1, from the power supply 25, and to an external device connected to the receptacle connector 191 of the USB interface 19. A value of power to be supplied to an external device may be written into, for example, a predetermined area of the RAM 13, together with connector information representing the external device is connected to which one of the receptacle connectors 191. For example, when each of two external devices is connected to a respective one of the receptacle connectors 191, two pieces of external device power information, each indicating a value of power to be supplied to a respective one of the external devices, and two pieces of connector information, each corresponding to a respective one of the two pieces of the supply power information, are written into the predetermined area of the RAM 13. The CPU 12 refers to the information written into the predetermined area of the RAM 13 and causes the power supply 25 to generate power corresponding to the referred power information. The CPU 12 causes the USB interface 19 to provide the generated power to the relevant external device, via the corresponding receptacle connector 191, which is indicated in the connector information.

The CPU 12 controls the touch panel 21 to display a maximum suppliable power value of the MFP 1 in each of the standby mode and the printing mode read from the NVRAM 15, and one or more external device power values of powers to be supplied to the one or more external devices read from the predetermined area of the RAM 13. If the sum of the values of the powers to be applied to the external devices exceeds the maximum suppliable power value, the CPU 12 may control the touch panel 21 to display an error message. If the sum of the values of powers to be supplied to the external devices exceeds the maximum suppliable power value, and a particular one or more of the external devices have a power supply (e.g., a battery), the CPU 12 may rewrite the value of the power to be supplied to the particular one or more of the external devices to another value that is lower than its minimum operable power value. An external device with a power supply may be referred to as "an external device that can be powered by its own power supply." If the MFP 1 reduces the power, to be supplied to a particular external device that can be powered by its own power supply, to a value lower than its minimum operable power value, the particular external device can receive necessary power from its battery. The CPU 12 executes the setting screen displaying step S17, based on information, such as device information and a value of power to be supplied to an external device that are stored in the RAM 13, and the power value information 151 (e.g., the maximum suppliable power values) stored in the NVRAM 15.

Figure 6:
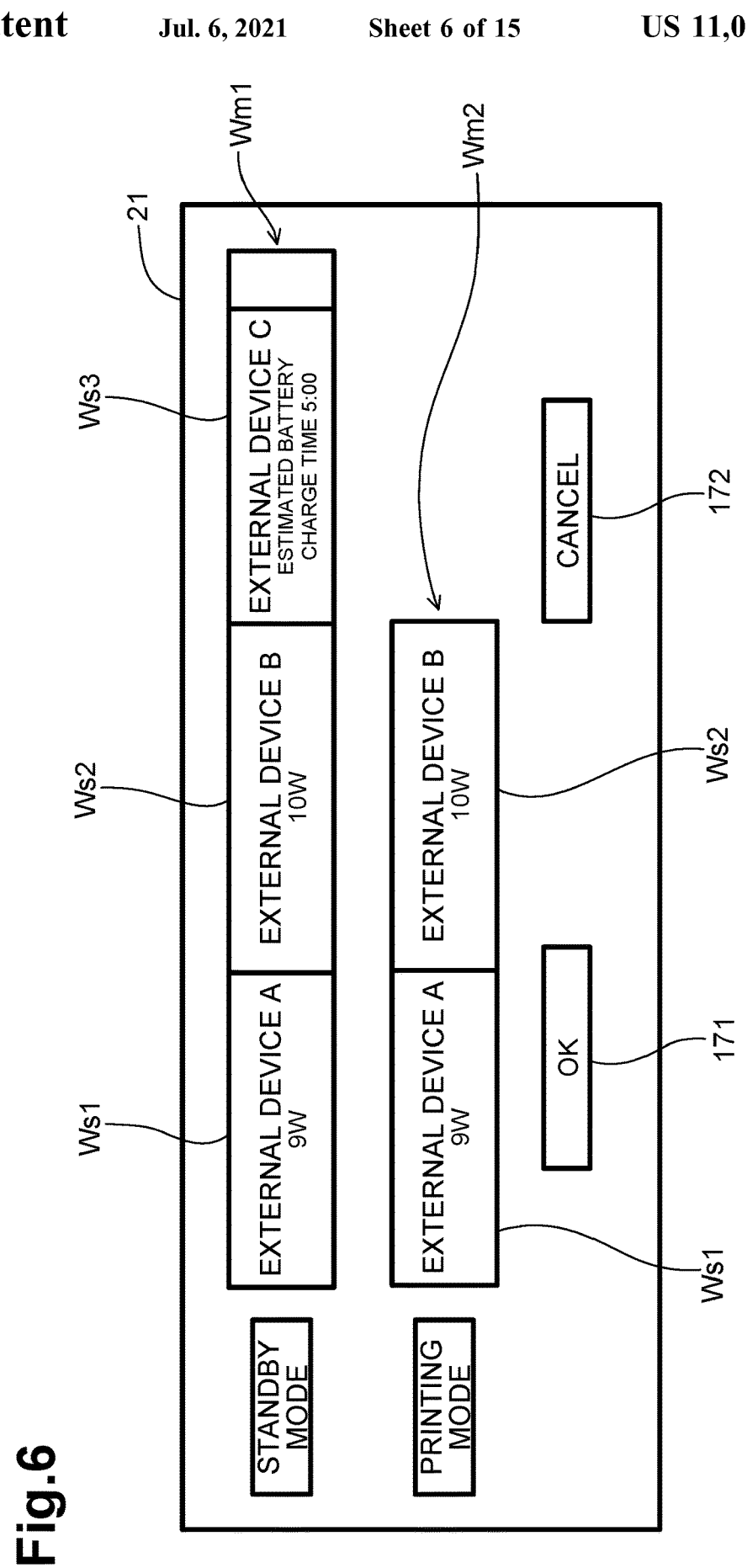
FIG. 6 depicts an example of a setting screen displayed in a touch panel, according to one or more aspects of the disclosure, to set a value of power to be supplied to an external device.

FIG. 6 depicts an example of the touch panel 21 displaying a setting screen for setting a value of power to be supplied to an external device. As depicted in FIG. 6, the touch panel 21 displays, at an upper portion thereof, a graph Wm1, e.g., a horizontal or rectangular bar, representing the maximum suppliable power value in the standby mode.

In one example, the graph Wm1 may include one or more sections, each representing a value of power to be supplied to an external device. In the example of FIG. 6, the graph Wm1 includes, for example, rectangular, sections Ws1, Ws2 and Ws3 that respectively represent a value of power to be supplied to an external device A, a value of power to be supplied to an external device B, and a value of power to be supplied to an external device C in the standby mode. The external devices A-C correspond to, for example, the permanent memory 31, the external memory 32, and the notebook PC 33, respectively. In FIG. 6, each of the sections Ws1, Ws2 and Ws3 has a text indicating a device name, such as "external device A," "external device B," and "external device C." The section Ws3 for the external device C has a text □estimated battery charge time □and a numeral "5:00" representing the estimated battery charge time, below the text of "the external device C." The estimated battery charge time will be described in detail below. The length of the graph Wm1 indicates an amount or a value of the maximum suppliable power in the standby mode, and the length of each section Ws1, Ws2, and Ws3 included in the graph Wm1 indicates an amount or a value of power to be supplied to a corresponding one of the external devices A-C in the standby mode. For example, in the example of FIG. 6, the length of the section Ws1 of the graph Wm 1 in a lateral direction (e.g., left-right direction in FIG. 6) representing a value of power supply to the external device A is shorter than that of the section Ws2 representing a value of power supply to the external device B. This means that a value of supply power to be supplied from the MFP 1 to the permanent memory 31 (e.g., 9 W) is smaller than a value of power to be supplied from the MFP 1 to the external memory 32 (e.g., 10 W). The graph Wm1 includes an unallocated section at a right portion thereof in FIG. 6. This means that the maximum suppliable power value in the standby mode is greater than the sum of the values of powers to be supplied to the external devices A-C in the standby mode. The CPU 12 may control the touch panel 21 to display each of the sections Ws1-Ws3 in a different color to visually distinguish between the sections Ws1-Ws3. In another embodiment, the CPU 12 may control the touch panel 21 to display a numeral (e.g., 30 W) of the maximum suppliable power value in the standby mode. In the graph Wm1 for the standby mode depicted in FIG. 6, the numeral of the value of power to be supplied to the external device A (e.g., 9 W) is displayed in the section Ws1, and the numeral of the value of power to be supplied to the external device B (e.g., 10 W) is displayed in the section Ws2.

Similar to the graph Wm1, the touch panel 21 displays another graph Wm2 e.g., a horizontal or rectangular bar, representing the maximum suppliable power value in the printing mode, as depicted in FIG. 6. The graph Wm2 is displayed below the graph Wm1. The graph Wm2 includes, for example, rectangular, sections Ws1 and Ws2 that respectively represent a value of power to be supplied to the external device A and a value of power to be supplied to the external device B in the printing mode. Each of the sections Ws1 and Ws2 of the graph Wm2 has a text indicating a device name, such as □external device A, □and □external device B. □The length of the graph Wm2 indicates an amount or a value of the maximum suppliable power in the printing mode, and the length of each section Ws1 and Ws2 included in the graph Wm2 indicates an amount or a value of power to be supplied to a corresponding one of the external devices A and B in the printing mode. As described above, the maximum suppliable power value in the printing mode is smaller than that in the standby mode, due to the driving of the image forming unit 16 for printing. For this reason, the length of the graph Wm 2 for the printing mode in the lateral direction is displayed shorter than that of the graph Wm 1 for the standby mode in the lateral direction. In one example as depicted in FIG. 6, the MFP 1 is configured not to provide or supply power to the external device C (e.g., the notebook PC 33) in the printing mode, so that the graph Wm2 for printing mode does not include the section Ws3 that represents a value of power to be supplied to the external device C. The CPU 12 may control the touch panel 21 to display a numeral (e.g., 19 W) of the maximum suppliable power value or a value of power to be supplied to an external device in the printing mode. In the graph Wm2 for the printing mode depicted in FIG. 6, the numeral of the value of power to be supplied to the external device A (e.g., 9 W) is displayed in the section Ws1, and the numeral of the value of power to be supplied to the external device B (e.g., 10 W) is displayed in the section Ws2. In the example of FIG. 6, an OK button 171 and a cancel button 172 are provided or displayed below the graph Wm2. In the illustrative embodiment, a user of the MFP 1 is allowed to touch or press portions of the touch panel 21 where the sections Ws1-Ws3 are displayed, with his/her finger and to move the touch over the surface of the touch panel 21 in the lateral direction from a first point of contact to a second point of contact. During the movement, the user may maintain contact with the touch panel 21 and then release contact with the touch panel 21 at the second point of contact. Such user's touch may be referred to as a □press-and-drag operation. □As will be described in detail below, the touch panel 21 outputs signals indicating an amount of the movement or drag of the touch in the lateral direction and in which side (e.g., left or right) the touch is moved (e.g., a moving direction of the touch or a dragging direction). The CPU 12 receives the signals output from the touch panel 21 and determines the amount of the movement of the touch (e.g., the amount of dragging) and the moving direction of the touch (e.g., the dragging direction). The CPU 12 may control the touch panel 21 to display the sections Ws1, Ws2, and Ws3 whose lengths in the lateral direction may be changed in accordance with the determined amount of dragging and the dragging direction.

The touch panel 21 is configured to output, to the CPU 12, a signal indicating that a user touches or presses a portion of the touch panel 21 where the OK button 171 is displayed. In response to receiving the signal, the CPU 12 changes a value of power to be supplied to each of the external devices A-C that has been stored in the predetermined area of the RAM 13, to a new value based on the determined amount of dragging and the dragging direction. The CPU 12 controls the power supply 25 to supply or provide power to each of the external devices A-C in accordance with the new value.

Referring back to FIG. 3, subsequent to S17 in which the CPU 12 controls the touch panel 21 to display the setting screen, the CPU 12 determines whether each of the one or more external devices connected to the USB interface 19 includes a battery (S18), for example, based on the information on a presence or absence of a battery, which is included in the device information. In response to determining that none of the external devices has a battery (S18: NO), the CPU 12 executes S23 and subsequent steps depicted in FIG. 4.

In response to determining that an external device has a battery (S18: YES), the CPU 12 determines whether a power profile for the external device having a battery is stored in, for example, the NVRAM 15 (S19). For example, the power value information 151 stored in the NVRAM 15 may include a power profile. The CPU 12 searches for a power profile in the NVRAM 15. In response to determining that the NVRAM 15 does not store the power profile for the external device (S19: NO), the CPU 12 executes S23 and subsequent steps depicted in FIG. 4.

Figure 7:
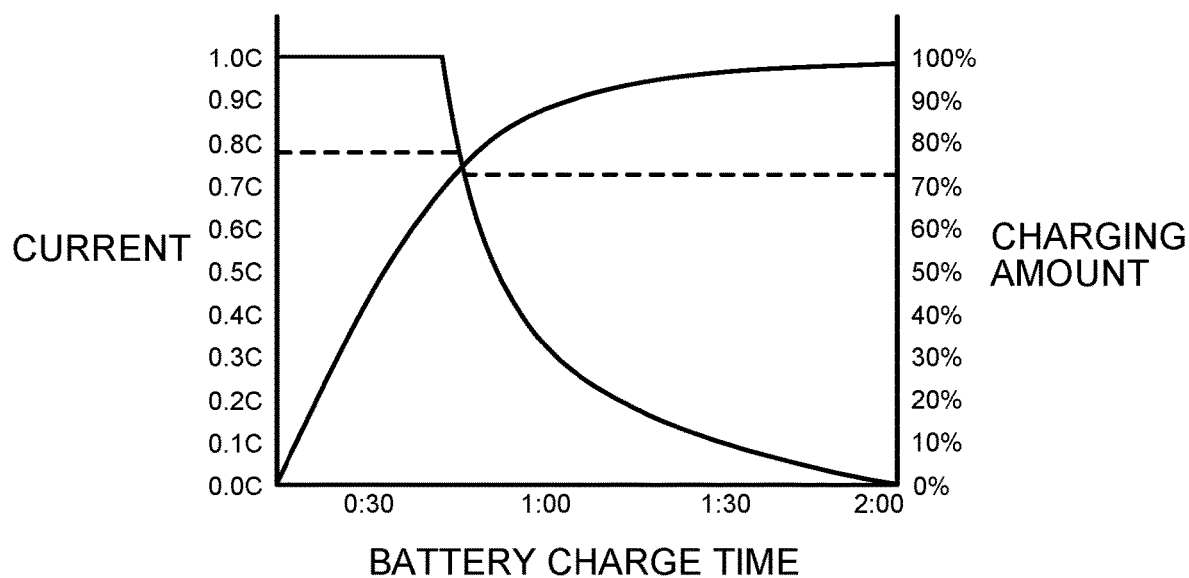
FIG. 7 depicts a graph representing an example of a power profile.

FIG. 7 depicts an example of a power profile. The power profile is data representing a relationship between values of charging current flowing into a battery of an external device that can be powered by its own power supply and battery charging amounts. In FIG. 7, the left vertical axis indicates values of battery charging current relative to a battery capacity. The battery capacity or the capacity of a battery is a measure of the amount of charge that can be discharged from the battery over a time from the start to the end of the discharge. For example, a capacity of a battery that will allow one (1) ampere (A) of current to flow for one hour is one (1) Ah. For example, when 1 A of charging current flows into a battery with a capacity of 1 Ah, a value of charging current relative to a battery capacity is 1.0 C; and when 0.5 A of charging current flows into a battery with a capacity of 1 Ah, a value of charging current relative to a battery capacity is 0.5 C. The right vertical axis indicates battery charging amounts, and the horizontal axis indicates periods of battery charge time. As depicted in FIG. 7, for relatively low battery charging amounts (approx. 0% to 65%), a battery charging current value is constant (e.g., 1.0 C). For relatively high battery charging amounts, e.g., over approx. 65%, battery charging current values rapidly decrease. For higher battery charging amounts, e.g., over approx. 95%, battery charging current values gradually decrease. A battery may be charged rapidly approximately up to approx. 80%. After that, the battery may be charged slowly to approach a 100% charging level.

In response to determining that such a power profile that represents a relationship between battery charging current values, charging amounts, and periods of battery charge time, is stored in the NVRAM 15 (S19: YES), the CPU 12 controls the touch panel 21 to display an estimated battery charge time of an external device corresponding to the power profile stored in the NVRAM 15 (S21). The CPU 12 controls the touch panel 21 to display an estimated battery charge time of the external device that can be powered by its own power supply, in a corresponding section (e.g., the section Ws3). The CPU 12 executes S23 and subsequent steps depicted in FIG. 4.

An estimated battery charge time may be determined in a following manner. The CPU 12 causes the power supply 25 to supply power to an external device, which can be powered by its own power supply, for a short period of time, to determine a value of current flowing through the power supply line of the corresponding receptacle connectors 191 (e.g., the charging current flowing into the battery of the external device). Subsequent to determining the value of charging current flowing into the battery of the external device, the CPU 12 causes the power supply 25 to stop supplying power to the external device. The CPU 12 determines an estimated battery charge time based on the power profile using the determined value of charging current. For example, if the CPU 12 determines that the value of charging current is 0.8 C, a charging amount is approximately 70% and the battery charge time is approximately 45 minutes, as depicted in FIG. 7. The CPU 12 determines an estimated battery charge time by subtracting 45 minutes from 1 hour and 20 minutes, which is the time required for the battery to be almost fully charged (95% charged). Accordingly, the CPU 12 determines 35 minutes as an estimated battery charge time for the external derive corresponding to the power profile. The CPU 12 controls the touch panel 21 to display the estimated battery charge time in a corresponding section Ws1-Ws3. For example, as depicted in FIG. 6, the CPU 12 controls the touch panel 21 to display an estimated battery charge time (e.g., 5 minutes or 5:00) in the section Ws3, which represents the value of power supply to the external device C (e.g., the notebook PC 33) having a battery. The CPU 12 may correct the estimated battery charge time, for example in the following case. A change in a value of power to be supplied to an external device may cause a value of power to be supplied to an external device battery to decrease (in the standby mode and/or in the printing mode). Due to the decrease in the power to be supplied to the external device battery, the battery may not receive a sufficient power as expected in the power profile. In such case, the CPU 12 may correct the estimated battery charge time, based on the power to be actually supplied to the battery.

An external device having a battery (e.g., an external device that can be powered by its own power supply) may determine a value of charging current flowing into the battery. In this configuration, the external device may send a signal indicative of the determined charging current value through an USB interface of the external device to the CPU 12 of the MFP 1. The CPU 12 may receive the signal from the external device via the USB interface 19. The CPU 12 may determine an estimated battery charge time, based on the current value received from the external device. If the power value information 151 include data of only a portion of a power profile (e.g., a portion of the graph in FIG. 7), the CPU 12 may estimate and complete the other portion of the power profile, based on available data (e.g., a charging amount and a value of charging current relative to a battery capacity). Power profile data may be pre-stored in, for example, the NVRAM 15 (as the power value information 151) or may be generated by the CPU 12. For example, the CPU 12 may fail to read from the NVRAM 15 a power profile (S19: NO) for an external device that includes a battery and is determined to be connected to the receptacle connector 191. In such case, while controlling the power supply 25 to supply power to the external device to charge its battery, the CPU 12 may regularly determine a value of the charging current flowing into the battery of the external device. Every time a charging current value is determined, the CPU 12 may determine a charging time. For example, while the battery of the external device is being charged, the CPU 12 may receive information, when necessary, indicating a charged amount of the battery at that moment from the external device. The CPU 12 may generate a power profile, in which the obtained current values, the charging times, and the charged amounts are associated with one another. The CPU 12 may store the power profile in the NVRAM 15. For example, in response to determining that the external device whose power profile has been stored in the NVRAM 15, is re-connected to the MFP 1 (e.g., the USB interface 19), the CPU 12 may determine, at S21 of FIG. 3, an estimated battery charge time for the external device, using the power profile stored in the NVRAM 15.

Subsequently, the CPU 12 may receive a user's operation or input on the touch panel 21.

At S23 of FIG. 4, the CPU 12 determines whether a user touches the touch panel 21, e.g., the touch panel 21 outputs a signal in response to a user's touch on the touch panel 21, for example, with his/her finger. Until the CPU 12 receives a signal output from the touch panel 21 in response to a user's touch on the touch panel 21 (S23: NO), the CPU 12 repeats S23. The touch panel 21 may maintain the display screen or setting screen (as depicted in FIG. 6), that is displayed at S17.

Subsequently, in response to determining that the touch panel 21 outputs a signal in response to a user's operation (S23: YES), the CPU 12 determines whether the signal is indicative of a press-and-drag operation on any of the sections Ws1-Ws3 displayed in the touch panel 21 (S25). In response to determining that the signal is not indicative of a press-and-drag operation on any of the sections Ws1-Ws3 (S25: NO), the CPU 12 executes S41 and subsequent steps in FIG. 4. An area of the touch panel 21 where any information can be displayed has some touch-sensitive portions, such as the sections Ws1-Ws3 for the external devices A-C, as well as the OK and cancel buttons 171 and 172. A user's touch (e.g., a press-and-drag operation) on a touch-sensitive portion causes the touch panel 21 to output a signal in response to the user's touch. When a user touches the OK button 171 or the cancel button 172, the CPU 12 determines that the touch panel 21 outputs a signal in response to the user's touch (S23: YES), and determines that the signal is not indicative of a press-and-drag operation on any of the sections Ws1-Ws3 (S25: NO).

In response to determining that the signal is indicative of a press-and-drag operation on any of the sections Ws1-Ws3 (S25: YES), the CPU 12 determines whether the sum of values of powers to be supplied to the external devices A-C, the values newly allocated by the user's press-and-drag operation, exceeds the maximum suppliable power value represented by the graph Wm1, Wm2 (S27). In other words, the CPU 12 determines, from the received signal, which section Ws1-Ws3 is pressed or touched, an amount of the movement/drag of the touch, and the moving/dragging direction of the touch. Based on the results of the determination, the CPU 12 determines how much the power to be supplied is to be increased or decreased for what external device(s) in connection with the user's press-and-drag operation. At S27, the CPU 12 determines whether the sum of newly allocated values with the user's press-and-drag operation, exceeds the corresponding maximum suppliable power value represented by the graph Wm1, Wm2.

Figure 8:
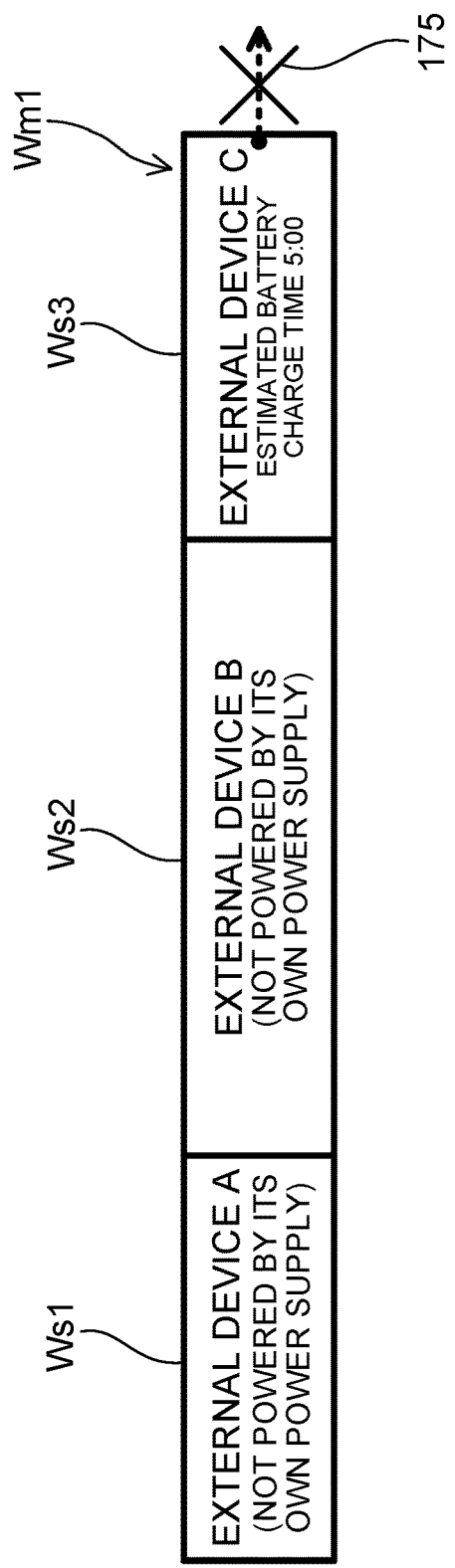
FIG. 8 depicts an example of a user's operation on the touch panel according to one or more aspects of the disclosure.

FIGS. 8-12 depict examples of a user's press-and-drag operation on the touch panel 21 displaying the graph Wm1 representing the maximum suppliable power value for the standby mode. In FIGS. 8-12, each of the sections Ws1 and Ws2 of the graph Wm1 has a text □not powered by its own power supply □below the name of each external device A and B. This text is provided to clarify that each of the external devices A and B does not include a power supply. FIG. 8 represents that the maximum suppliable power value stored in the NVRAM 15 as the power value information 151 is equal to the sum of values of powers to be supplied to the external devices A-C, the values being written in the predetermined area of the RAM 13. For example, in the touch panel 21 displaying the setting screen as depicted in FIG. 8, a user may touch or press the section Ws3 representing a value of power to be supplied to the external device C with his/her finger and then move the touch over the surface of the touch panel 21 toward the right. In response to this operation, the touch panel 21 outputs a signal indicating that a first point of contact is in the section Ws3 (for the external device C) of the graph Wm1, a signal indicative of the amount of dragging, and a signal indicative of the dragging direction. The CPU 12 receives the signals output from the touch panel 21 and determines that the user's press-and-drag operation is to increase the value of the power to be supplied to the external device C without increasing or decreasing the values of powers to be supplied to the external devices A and B. Such press-and-drag operation causes the sum of values of the powers to be supplied to the external devices A-C to exceed the maximum suppliable power value for the standby mode. Accordingly, the CPU 12 disables or cancels the press-and-drag operation for increasing the value of the power to be supplied to the external device C, because the MFP 1 is unable to supply or provide power exceeding the maximum suppliable power to the external devices. In response to determining that the sum of the newly allocated values of powers to be supplied to the respective external devices exceeds the corresponding maximum suppliable power value (e.g., the maximum suppliable power value for the standby mode in a case of FIG. 8) (S27: YES), the CPU 12 disables or cancels the operation (S35), and proceeds or returns to S23. At S35, the CPU 12 may provide a notification 175 (e.g., alert or warning) to the user, via the touch panel 21, as depicted in FIG. 8. The notification 175 may notify the user that his/her press-and-drag operation, which causes the sum of the newly allocated values of powers to exceed the maximum suppliable power value, is cancelled.

In response to determining that the sum of newly allocated values of powers to be supplied to the external devices A-C does not exceed the corresponding maximum suppliable power value (S27: NO), the CPU 12 determines whether the user's press-and-drag operation is to reduce or lower the value of power to be supplied to an external device that is not powered by its own power supply (S31). The external device that is not powered by its own power supply may not operate properly without power of at least minimum operable power value. Accordingly, it may be one of the solutions to prohibit such user's press-and-drag operation for reducing a value of power to be supplied to an external device that is not powered by its own power supply for proper operation.

A user may intentionally perform a press-and-drag operation for reducing a value of the power to be supplied to an external device that is not powered by its own power supply for a variety of reasons. For example, a user may wish to increase power supply to an external device including a battery to charge its battery quickly even by suspending an operation of an external device that is not powered by its own power supply. In this case, a user may desire to intentionally reduce the power to be supplied to the external device that is not powered by its own power supply.

Figure 9:
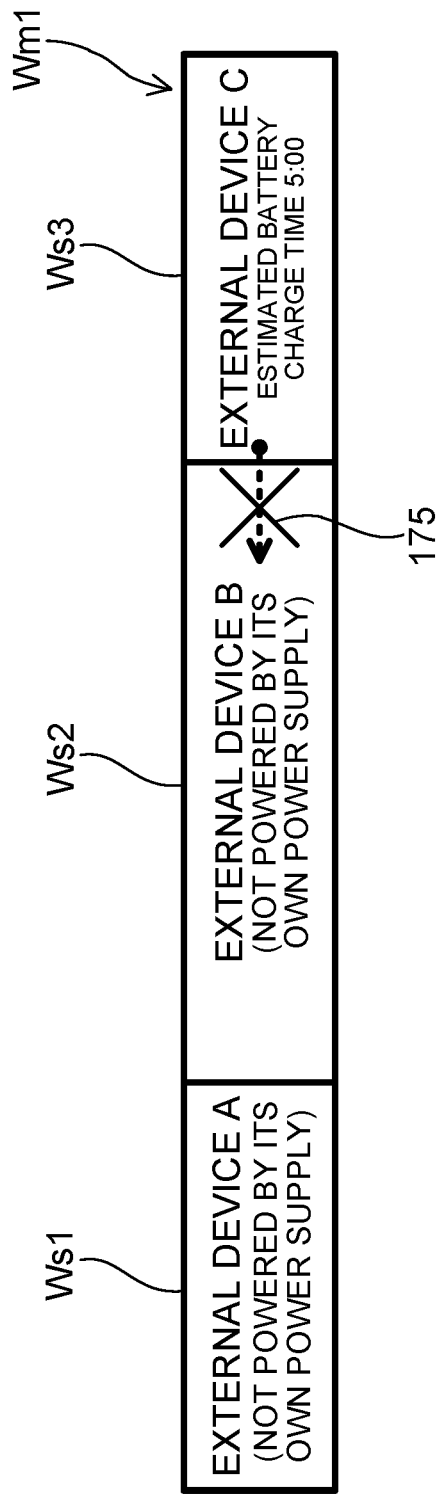
FIG. 9 depicts an example of a user's operation on the touch panel according to one or more aspects of the disclosure.

FIG. 9 depicts a user's press-and-drag operation on the graph Wm1 for elongating the section Ws3 for external device C toward the section Ws2 for the external device B. The user touches or presses the section Ws3 on the touch panel 21 with his/her finger and then moves or drags the touch over the surface of the touch panel 21 toward the left. It will be considered that the user performs such operation to increase the value of power to be supplied to the external device C without the intention of reducing the value of power to be supplied to the external device B. The touch panel 21 outputs a signal indicating that a first point of contact is in the section Ws3 of the graph Wm1 (for standby mode), a signal indicative of the amount of dragging, and a signal indicative of the dragging direction. The CPU 12 receives the signals output from the touch panel 21 and determines that the user's press-and-drag operation is not indented to reduce the value of the power to be supplied to the external device B. Accordingly, the CPU 12 disables or cancels such user's operation to reduce the power to be supplied to the external device B, which is not powered by its own power supply. The CPU 12 controls the touch panel 21 to display the notification 175 (e.g., alert or warning), as depicted in FIG. 9. The notification 175 may notify the user that his/her press-and-drag operation is cancelled.

Figure 10:
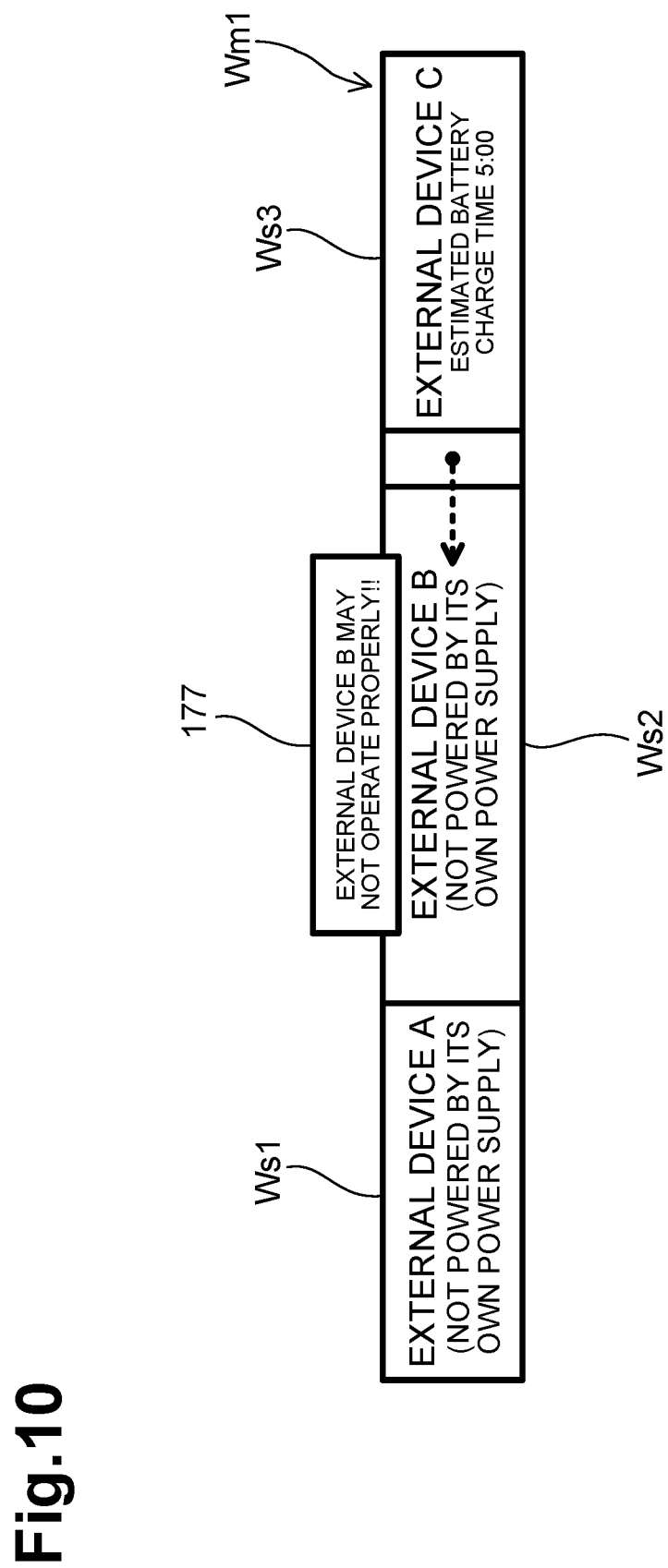
FIG. 10 depicts an example of a user's operation on the touch panel according to one or more aspects of the disclosure.
Figure 11:
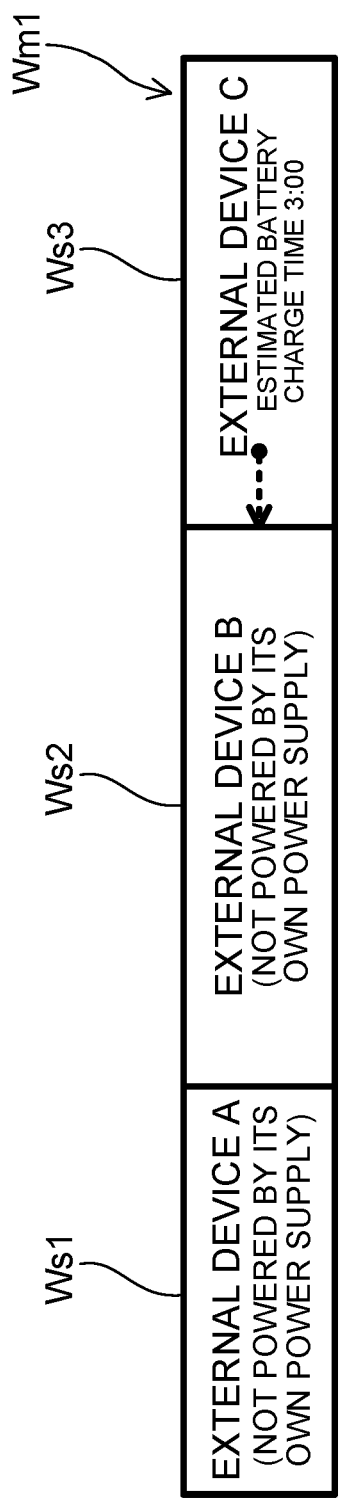
FIG. 11 depicts an example of a user's operation on the touch panel according to one or more aspects of the disclosure.

FIG. 10 depicts a user's press-and-drag operation on the graph Wm1 for shortening the section Ws2 for the external device B toward the left. The user touches or presses the section Ws2 on the touch panel 21 with his/her finger and then moves or drags the touch over the surface of the touch panel 21 toward the left. It will be considered that the user performs such operation with an intention of reducing the value of power to be supplied to the external device B, which is not powered by its own power supply. The touch panel 21 outputs a signal indicating that a first point of contact is in the section Ws2 of the graph Wm1, a signal indicative of the amount of dragging, and a signal indicative of the dragging direction of the touch. The CPU 12 receives the signals output from the touch panel 21 and determines that the user's press-and-drag operation is intended to reduce the value of the power to be supplied to the external device B. The CPU 12 enables the user's operation. The CPU 12 controls the touch panel 21 to display the section Ws2 whose length has been shortened toward the left by the determined amount of dragging. Further, the CPU 12 controls the touch panel 21 to display a potential error message 177 indicating that the external device B, which is not powered by its own power supply, may not operate properly. After that, the user is allowed to touch or press the section Ws3 on the touch panel 21 with his/her finger and move the touch over the surface of the touch panel 21 toward the section Ws2 (e.g., toward the left), by an amount that the section Ws2 is shortened, as depicted in FIG. 11. The user may thus elongate the section Ws3 for the external device C toward the left. This may increase the value of power to be supplied from the MFP 1 to the external device C, and enable the battery of the external device C to be charged more quickly. In accordance with the changes in the length of the section Ws3, the CPU 12 may control the touch panel 21 to change a display of the estimated battery charge time (e.g., from "5:00" to "3:00" as depicted in FIG. 11).

Referring back to FIG. 4, in response to determining at S31 that a user's operation is to reduce a value of power supply to an external device that is not powered by its own power supply (S31: YES), the CPU 12 determines whether the first point of contact is in a section for an external device that is not powered by its own power supply (S33). In other words, the CPU 12 determines whether the user's operation is or is not intended to reduce a value of power to be supplied to the external device that is not powered by its own power supply, as described with reference to FIGS. 9 and 10.

At S33, in response to determining that the first point of contact is not in a section for an external device that is not powered by its own power supply, e.g., the first point of contact is in a section for an external device that can be powered by its own power supply (S33: NO), the CPU 12 disables the user's operation (S35), and proceeds or returns to S23. The CPU 12 thus disables the user's unintentional operation for reducing a value of power to be supplied to the external device B, which is not powered by its own power supply, as described with reference to FIG. 9.

At S33, in response to determining that the first point of contact is in a section for an external device that is not powered by its own power supply (S33: YES), the CPU 12 controls the touch panel 21 to display the potential error message 177 (as depicted in FIG. 10) indicating that the external device that is not powered by its own power supply may not operate properly. The user viewing the potential error message 177 may understand that his/her operation may cause an error of the external device, which is not powered by its own power supply. In addition to causing the touch panel 21 to display the potential error message 177 (S37), the CPU 12 causes or controls the touch panel 21 to change (e.g., reduce) the length of the section for the external device that is not powered by its own power supply, as depicted in FIG. 10, by the amount of dragging, which is determined from the signal received from the touch panel 21, toward the dragging direction, which is also determined from the signal from the touch panel 21 (S39). Thus, the user can intentionally reduce the length of a particular section for an external device that is not powered by its own power supply and increase the length of another section for an external device that can be powered by its own power supply by an amount that the length of the particular section is shortened. Subsequent to causing the touch panel 21 to display the shortened section for the external device that is not powered by its own power supply, the CPU 12 proceeds or returns to S23.

Figure 12:
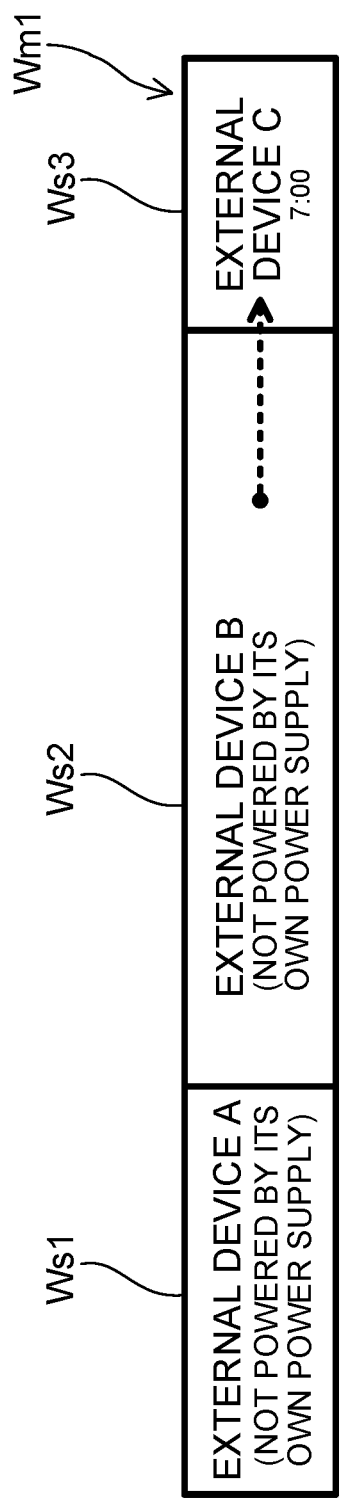
FIG. 12 depicts an example of a user's operation on the touch panel according to one or more aspects of the disclosure.

At S31, in response to determining that a user's operation is not intended to reduce a value of power to be supplied to an external device that is not powered by its own power supply (S31: NO), the CPU 12 controls the touch panel 21 to change (e.g., increase or reduce) the length of the section which is first touched or pressed by a user (e.g., the first point of contact being in the section), by the amount of dragging, which is determined from the signal from the touch panel 21, toward the dragging direction, which is also determined from the signal from the touch panel 21 (S40). For example, as depicted in FIG. 12, such a user's operation can be enabled in which the section Ws2 for the external device B that is not powered by its own power supply is elongated, and the section Ws3 for the external device C that can be powered by its own power supply is shortened. In the example of FIG. 12, the sum of the values of powers to be supplied to the external devices A-C matches the maximum suppliable power value in the standby mode. In other words, the length of the graph Wm1 in the lateral direction or in a changeable direction in which lengths of sections of the graph Wm1 are changeable, matches the sum of the lengths of the sections Ws1-Ws3 in the lateral direction. The CPU 12 may enable a user's operation for changing the length of a section in the changeable direction within a range or the bar of the graph Wm1. In an example of FIG. 12, a user may touch or press the section Ws2 on the touch panel 21 with his/her finger and then move the touch over the surface of the touch panel 21 toward the section Ws3 (e.g., toward the right), by a particular amount. In response to such press-and-drag operation, the CPU 12 controls the touch panel 21 to increase the length of the section Ws2 by the particular amount in the lateral direction and reduce the length of the section Ws3 by the particular amount in the lateral direction (S40). In other words, the CPU 12 may control the touch panel 21 to change lengths of sections in connection with each other. Subsequently, the CPU 12 proceeds or returns to S23. If the maximum suppliable power value in the standby mode is greater than the sum of the values of powers to be supplied to the external devices A-C, e.g., the graph Wm1 has an unallocated or blank section, a user may allocate the unallocated/blank section to a particular section. In this case, the CPU 12 may control the touch panel 21 to elongate the particular section but not shorten another section in connection with elongation of the particular section. In the example of FIG. 12, a user's press-and-drag operation for elongating the section Ws2 causes space or area in the section Ws3 to be reduced. Due to the limited space, the section Ws3 does not include or indicate the text ☐estimated battery charge time. ☐A press-and-drag operation on a section of the graph Wm2 for the printing mode may be performed similar to the examples discussed above with reference to FIGS. 8-12.

In response to determining at S25 that the signal received from the touch panel 21 in response to a user's operation is not indicative of a press-and-drag operation on any of the sections Ws1-Ws3 (S25: NO), e.g., in response to determining that the signal is indicative of touch or pressing of the OK button 171 or the cancel button 172 (S25: NO), the CPU 12 executes S41. At S41, the CPU 12 determines whether the signal output from the touch panel 21 is indicative of touch or pressing of the OK button 171.

In response to determining that the signal is indicative of touch or pressing of the OK button 171 (S41: YES), the CPU 12 overwrites values corresponding to lengths, in the lateral or changeable direction, of sections displayed in the touch panel 21 for the standby mode and the printing mode (e.g., as depicted in FIG. 6), into the predetermined area of the RAM 13 as values of power to be supplied to the external devices in the standby mode and the printing mode (S43). The CPU 12 controls touch panel 21 to change the display screen into a previous state (S44). For example, the CPU 12 controls the touch panel 21 to cease the setting screen as depicted in FIG. 6 and display an initial or start screen. Alternatively, the CPU 12 may cause touch panel 21 to be turned off (S44).

In response to determining at S41 that the signal received from the touch panel 21 is not indicative of touch or pressing of the OK button 171 (S41: NO), e.g., the signal is indicative of touch or pressing of the cancel button 172, the CPU 12 controls the touch panel 21 to change the display screen into a previous state (S44).

Subsequent to executing S44, the CPU 12 ends the power value setting processing.

In another embodiment, The CPU 12 may control the touch panel 21 to display a representation of either one of the maximum suppliable power values in the standby mode and the printing mode. In still another embodiment, the CPU 12 may be configured to control the touch panel 21 to display representations of values of the maximum suppliable power and powers to be supplied to external devices for the scanner function and the facsimile function, rather than for the printing mode.

As the standby mode, the MFP 1 may have an off mode and a sleep mode. In the off mode, the power supply 25 is turned off and an auxiliary power supply that provides less power than the power supply unit 25 is operated. In the sleep mode, power is supplied only to a limited component, such as CPU 12, and power is not supplied to other components. The CPU 12 may control the touch panel 21 to display representations of values of maximum suppliable power and power to be supplied to external devices in the off and sleep modes.

(Power Supply Processing)

Figure 5:
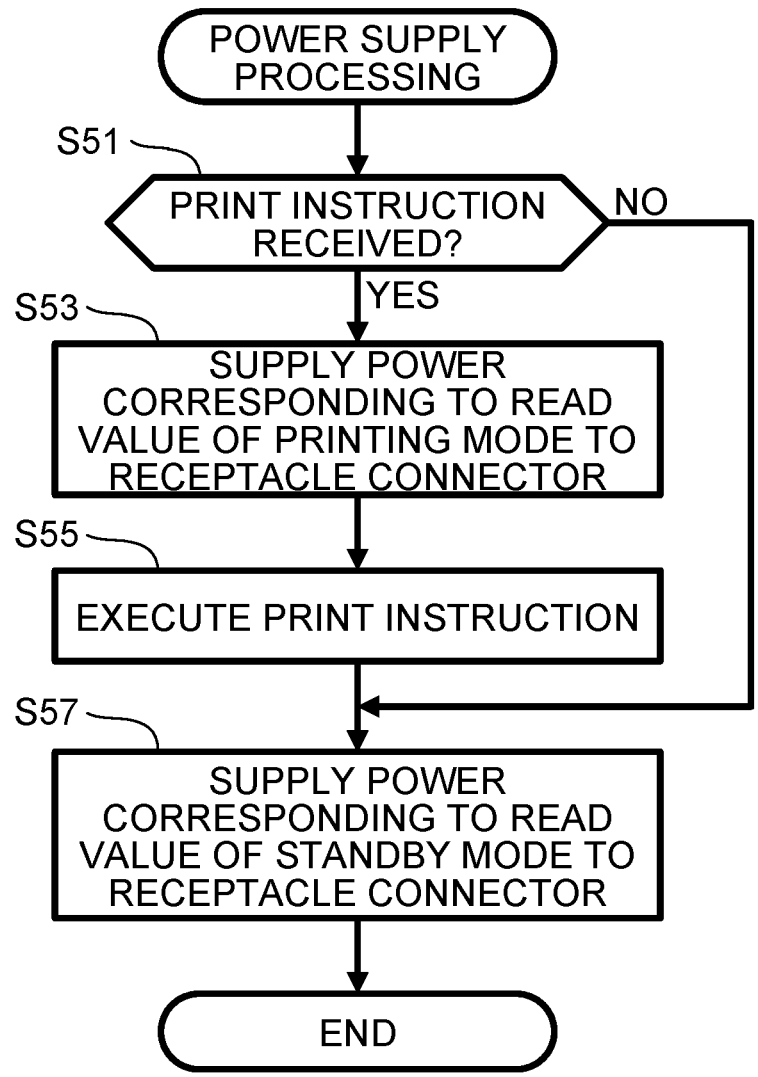
FIG. 5 is a flowchart depicting power supply processing according to one or more aspects of the disclosure.

Referring to FIG. 5, processing of power supply from the MFP 1 to an external device is described. For example, the CPU 12 may execute programs stored in the ROM 14 at boot-up or start-up of the MFP 1, so that the processing depicted in FIG. 5 may be repeatedly executed.

The CPU 12 determines whether the MFP 1 has received a print instruction (S51). A print instruction is an instruction of executing a copy function, or an instruction, received from the PC 61 (refer to FIG. 1), for printing image data 153 based on a print job. In response to determining that the MFP 1 has received a print instruction (S51: YES), the CPU 12 reads from the predetermined area of the RAM 13, a value of power to be supplied to an external device in the printing mode and controls the power supply 25 to supply or provide power corresponding to the read value, to the receptacle connector 19 to which the external device is connected (S53). This configuration allows the MFP 1 to supply power to the external device connected to the receptacle connector 19, based on the value of power to be supplied to the external device in the printing mode.

Subsequent to executing S53, the CPU 12 executes the print instruction (S55). Subsequent to executing the print instruction, the CPU 12 reads from the predetermined area of the RAM 13, a value of power to be supplied to the external device in the standby mode and controls the power supply 25 to supply power corresponding to the read value, to the receptacle connector 19 to which the external device is connected (S57). This configuration allows the MFP 1 to supply power to the external device connected to the receptacle connector 19, based on the value of power to be supplied to the external device in the standby mode. The MFP 1 shifts to the standby mode. The CPU 12 ends the supply power processing as depicted in FIG. 5.

In response to determining at S51 that the MFP 1 has not received a print instruction (S51: NO), the CPU 12 executes S57.

3. Effects

The illustrative embodiment may have the following effects.

(1) The MFP 1 according to the illustrative embodiment may include the USB interface 19 configured to receive power from the power supply 25 and supply power to the on or more external devices over a connection; user interface 20 which includes the touch panel 21 configured to display information and to allow and receive a user's operation; memory (e.g., the RAM 13 or ROM 14); and the CPU 12. The CPU 12 may control the touch panel 21 to display a representation of a value of the maximum suppliable power that can be supplied from the MFP 1 through the USB interface 19 to the external devices. The CPU 12 may receive, via the user interface 20 and while controlling the touch panel 21 to display the representation of the maximum suppliable power value, a user-selected power value. The CPU 12 may overwrite values corresponding to the user-selected power value, into the predetermined area of the RAM 13 as values of power to be supplied to the external devices (S43 in FIG. 4). The CPU 12 may read the values of power to be supplied to the external devices from the predetermined area of the RAM 13, and control the power supply 25 to supply power corresponding to the read values to the corresponding receptacle connectors 191 to which the external devices are connected (S53 and S57 in FIG. 5).

In this configuration, a user viewing the touch panel 21 displaying the representation of the maximum suppliable power value, may understand the maximum power that can be supplied from the MFP 1 to one or more external devices connected to the USB interface 19, and may change power allocation or the value of power to be supplied to an external device.

(2) The CPU 12 determines whether an external device is connected to the USB interface 19 after boot-up of the MFP 1 (S11 in FIG. 3). In response to determining that an external device is connected the USB interface 19 after boot-up of the MFP 1, the CPU 12 may cause the USB interface 19 to receive from the external device its minimum operable power value (S12). The CPU 12 may write the minimum operable power value into the RAM 13 as a value of power to be supplied to the external device (S13).

This configuration may eliminate a user's operation for setting a value of minimum operable power necessary to drive an external device that is connected to the USB interface 19 after boot-up of the MFP 1.

(3) The CPU 12 may control the touch panel 21 to display the representation of the external device power value read from the memory, each representing a value of power to be supplied to an external device.

In this configuration, a user viewing the touch panel 21 displaying the representation of the external device power value read from the memory, may understand each power value that can be supplied from the MFP 1 to one or more external devices connected to the USB interface 19, and may change power allocation or the value of power to be supplied to an external device.

(4) Based on received signals indicating a press-and-drag operation on a section Ws1-Ws3, the CPU 12 may control the touch panel 21 to change the displayed representation Ws1-Ws3 of the external device power value in response to the user-selected power value received via the user interface 20.

This configuration may allow a user to intuitively change a value of power to be supplied to an external device while viewing a change of the representation Ws1-Ws3 displayed in the touch panel 21.

(5) The CPU 12 may determine whether the user-selected power value, which is the sum of newly allocated values of powers to be supplied to external devices exceeds the maximum suppliable power value (S27 in FIG. 4). In response to determining that the user-selected power value exceeds the maximum suppliable power value, the CPU 12 may control the touch panel 21 to display the representation of the maximum suppliable power value (S35).

This configuration may allow a user to intuitively understand that the user's operation (e.g., press-and-drag operation) to input the user-selected power value within a range that does not exceed the maximum suppliable power value may be valid. This configuration may prevent or reduce such a unfavorable situation that the CPU 12 tries to control the power supply 25 to supply or provide power exceeding the maximum suppliable power value, to external devices.

(6) The user interface 20 may be touch sensitive. The CPU 12 may receive the user-selected power value via touch input on the user interface 20.

This configuration may provide improved usability.

(7) The CPU 12 may control the touch panel 21 to display the graphs Ws1-Ws3 whose size correspond to the value of power to be supplied to the external device read from the memory.

This configuration may allow a user to intuitively view a value of power to be supplied to the external device in the sizes of the graphs Ws1-Ws3 displayed in the touch panel 21.

(8) The CPU 12 may control the touch panel 21 to display the bar graphs Ws1-Ws3 whose length correspond to the value of power to be supplied to the external device read from the memory. After a user's drag operation via the user interface 20 to elongate the bar graph, the CPU 12 may adjust the value of power to be supplied to the external device, stored in the memory, by adding the power value corresponding to the amount of dragging in the drag operation to elongate the bar graph. After a user's drag operation via the user interface 20 to shorten the bar graph, the CPU 12 may adjust the value of power to be supplied to the external device, stored in the memory, by subtracting the power value corresponding to the amount of dragging in the drag operation to shorten the bar graph.

This configuration may allow a user to intuitively change a value of power to be supplied to the external device while viewing a change in the lengths of the bar graphs Ws1-Ws3 displayed in the touch panel 21.

(9) The CPU 12 may control the touch panel 21 to display the graph whose size corresponds to the maximum suppliable power value. The graph whose size corresponds to the value of power to be supplied to the external device read from the memory may be displayed on the graph whose size corresponds to the maximum suppliable power value.

This configuration may provide improved usability.

(10) The CPU 12 may control the touch panel 21 to display the OK button 171. In response to determining that the signal output from the touch panel 21 is indicative of touch or pressing of the OK button 171, the CPU 12 may overwrite into the predetermined area of the RAM 13, power values corresponding to lengths, in the lateral or changeable direction, of sections displayed in the touch panel 21 in correspondence with external devices to which power is to be supplied (S43 in FIG. 4). In other words, the CPU 12 may overwrite into the predetermined area of the RAM 13, supplied power values displayed or represented in the touch panel 21. The supplied power values may be referred to when the MFP 1 actually supplies power to the external devices.

When a user desires to reflect his/her intent or setting, which is represented in the touch panel 21, as the values of supplied powers to be actually supplied from the MFP 1 to the external devices, the above-described configuration may reflect the user's intent or setting after the user's confirmation.

(11) The CPU 12 may control the touch panel 21 to display an indication (the estimated battery charge time) that the first external device comprises a power supply.

In this configuration, a user may understand the first external device that comprises the power supply, and may change power allocation or the value of power to be supplied to the external device.

(12) The CPU 12 may deny a user's operation to reduce a value of power to be supplied to an external device that does not include a power supply (S33 and S35 in FIG. 4).

An external device that does not include a power supply may be driven by the power from the MFP 1. Reduction in the value of power to be supplied to an external device that does not include a power supply may cause the external device to operate improperly or otherwise suspend or stop its operation. In the illustrative embodiment, the CPU 12 may disable the operation for reducing a value of power to be supplied to an external device that does not include a power supply. Accordingly, such an event that the external device is suspended or stopped, may be prevented or reduced.

(13) In response to a user's operation, via the user interface 20, to reduce a value of power to be supplied to an external device that does not include a power supply, the CPU 12 may control the touch panel 21 to display a warning notification, e.g., alert and warning, to a user (S37 in FIG. 4).

This configuration may notify a user that his/her operation may cause an error of the external device that is not powered by its own power supply.

(14) The CPU 12 may control the touch panel 21 to display a representation of a value of power to be supplied to an external device that includes a battery. The CPU 12 may calculate or determine an estimated battery charge time required to complete charging of the battery using power at a level of the value of power to be supplied to the external device read from the memory. The CPU 12 may control the touch panel 21 to display the estimated battery charge time in correspondence with the representation of the value of power to be supplied to the external device including the battery (see the section Ws3 in FIG. 6).

This configuration may allow a user to change a value of power to be supplied to an external device including a battery in the touch panel 21 while viewing the touch panel 21 displaying an estimated battery charge time of the battery. For example, if the user feels that the estimated battery charge time is long, the user may be allowed to increase the value of power to be supplied to the external device for faster battery charging.

(15) The CPU 12 may cause the power supply 25 to supply or provide power to an external device including a battery, to determine values of charging current flowing into the battery. The CPU 12 may generate a power profile, based on changes in the values of the charging current and changing amounts of the battery. In response to determining that the external device corresponding to the generated power profile is re-connected to the USB interface 19, the CPU 12 may determine an estimated battery charge time of the battery, based on the data representing a relationship between values of charging current flowing into the battery, capacity of the battery and a value of power to be supplied to the external device including the battery.

The CPU 12 may determine an appropriate estimated battery charge time for the external device, using the data.

(16) The image forming unit 16 is configured to form an image on a sheet. The CPU 12 may control the touch panel 21 to display representations of the maximum suppliable power values in the standby mode, in which the image forming unit 16 does not form an image, and in the printing mode, in which the image forming unit 16 forms an image. The CPU 12 may control the touch panel 21 to display representations of the power values in the standby mode and the printing mode, in correspondence with the representations of the maximum suppliable power values in the standby mode and the printing mode, respectively.

For printing, the image forming unit 16 needs to be driven, so that the maximum suppliable power value in the printing mode is lower than that in the standby mode in which the image forming unit 16 does not have to be driven. The CPU 12 may control the touch panel 21 to display a representation of a respective one of the maximum suppliable power values in the standby mode and the printing mode. This configuration may allow a user to set values of power to be supplied to external devices in the standby and printing modes, in view of differences between the maximum suppliable powers in the standby mode and the printing mode.

(17) The MFP 1 may be a printer.

In this configuration, a user viewing the touch panel 21 of the printer displaying the representation of the maximum suppliable power value, may understand the maximum power that can be supplied from the printer to one or more external devices connected to the USB interface 19, and may change power allocation or the value of power to be supplied to an external device.

(18) The touch panel 21 and the USB interface 19 may be disposed on a casing 10 of MFP 1.

(19) The representation maximum suppliable power value may be divided into a plurality of sections. One section of the plurality of sections corresponds to one external device. Another section of the plurality of sections corresponds to another external device.

This configuration may provide improved usability.

(20) The CPU 12 may control the touch panel 21 to display the representation of the maximum suppliable power value as a graph. The CPU 12 may adjust the value of power to be supplied to the external device for two external devices in response to a user drag input on the graph displayed in the touch panel 21.

This configuration may allow a value of power to be supplied to an external device to be changed, in association with a user's operation for changing a value of power to be supplied to another external device.

The CPU 12 may allow for a user's operation for reducing a value of the power to be supplied to an external device that includes a power supply, to a value below the minimum operable power value of the external device (refer to FIG. 12).

If a value of the power to be supplied from the MFP 1 to a particular external device that includes a power supply, is reduced to a value below the minimum operable power value of the particular external device, the particular external device can compensate for the shortage of necessary power using its own power supply. In association with a user's operation for reducing the value of power to be supplied to an external device that includes a power supply, power to be supplied to another external device may be increased. The power to be supplied to external devices may thus be allocated as desired.

The CPU 12 determines whether the touch panel 21 has received a user's operation for reducing a value of power to be supplied to an external device that does not include a power supply (S33 in FIG. 4). In response to determining that the touch panel 21 has received a user's operation for reducing a value of power to be supplied to an external device that does not include a power supply, the CPU 12 may control the touch panel 21 to reduce the length of the section representing the value of power supply to the external device that does not include a power supply (S39).

In response to a user's explicit instruction or operation to reduce a value of power to be supplied to an external device that does not include a power supply, the CPU 12 controls the touch panel 21 to reduce the length of the section representing the value of power supply to the external device. This configuration may allow a user to reduce the value of power to be supplied to an external device that does not include a power supply, as desired.

4. Modifications

While the disclosure has been described in detail with reference to the specific embodiment thereof, various changes, arrangements and modifications may be applied therein without departing from the spirit and scope of the disclosure.

Figure 13:
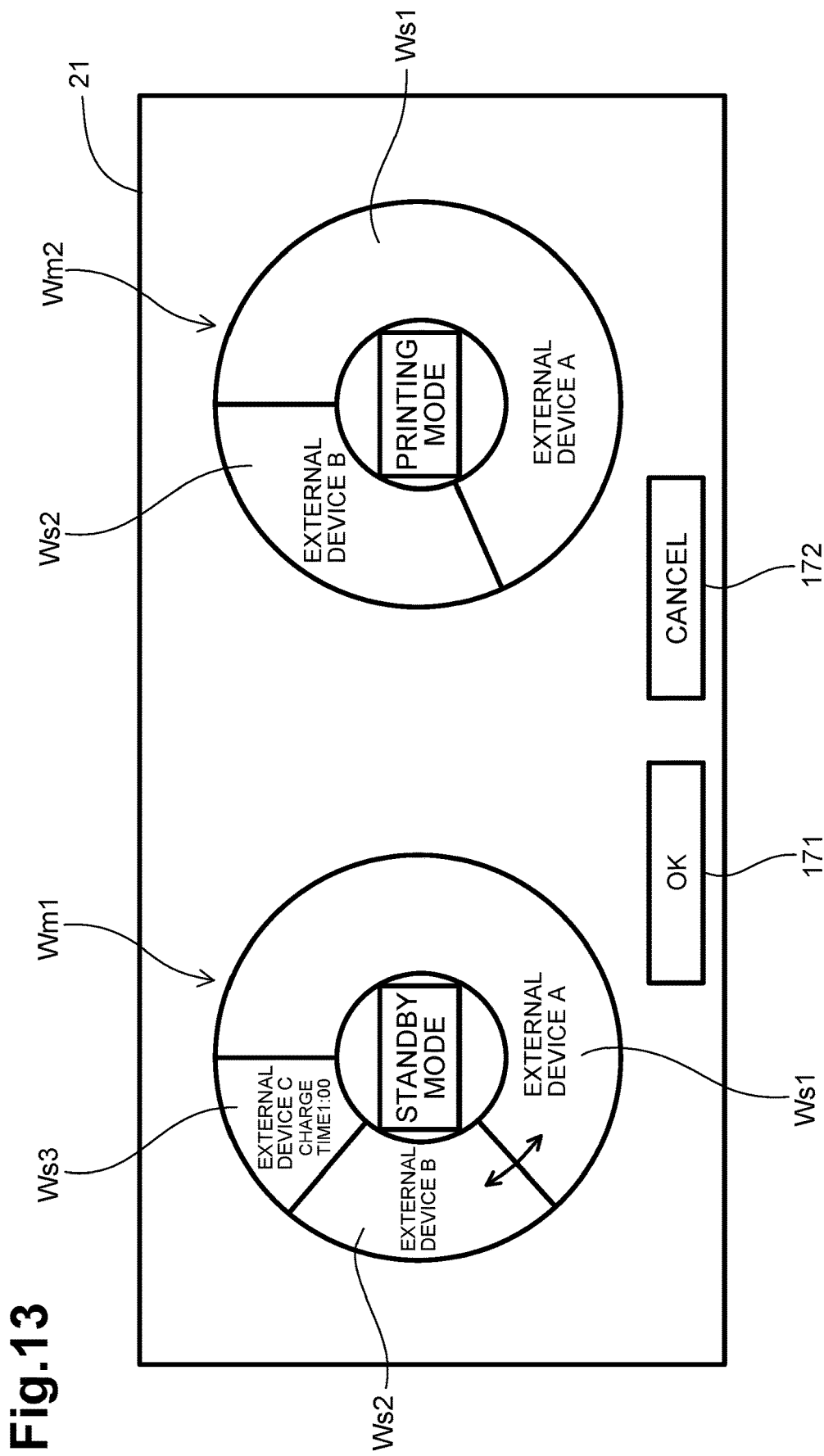
FIG. 13 depicts another example of a setting screen displayed in the touch panel, according to one or more aspects of the disclosure, to set a value of power to be supplied to an external device.

For example, as depicted in FIG. 6, the touch panel 21 displays the graphs Wm1 and Wm2 that represent the maximum suppliable power values in the standby mode and the printing mode, respectively, and the sections Ws1-Ws3 that represent values of powers to be supplied to external devices. This manner of displaying and representing the maximum suppliable power values and supply power values is merely an example and may be modified as desired. Further, in the illustrative embodiment, the touch panel 21 displays the bar graphs Wm1 and Wm2, each including one or more of rectangular sections. The sections Ws1-Ws3 represent values of supply powers to external devices. A user may touch, e.g., press and drag, a section Ws1-Ws3 to change the lengths of the sections Ws1-Ws3, thereby increasing or decreasing the values of supply powers to the corresponding external devices. This manner of increasing or decreasing a value of supply power to an external device is merely an example and may be modified as desired. For example, as depicted in FIG. 13, the touch panel 21 may display graphs Wm1 and Wm2 that, respectively, represent the maximum suppliable power values in the standby mode and the printing mode. Each of the graphs Wm1 and Wm2 is a pie chart or a doughnut chart having one or more sections Ws1-Ws3 that represent values of supply powers to external devices. For example, a user may touch or press one of the sections Ws1-Ws3 and move or drag the touch over the surface of the touch panel 21 in the circumferential direction of the doughnut chart, to increase or decrease values of supply powers to the external devices.

Figure 14:
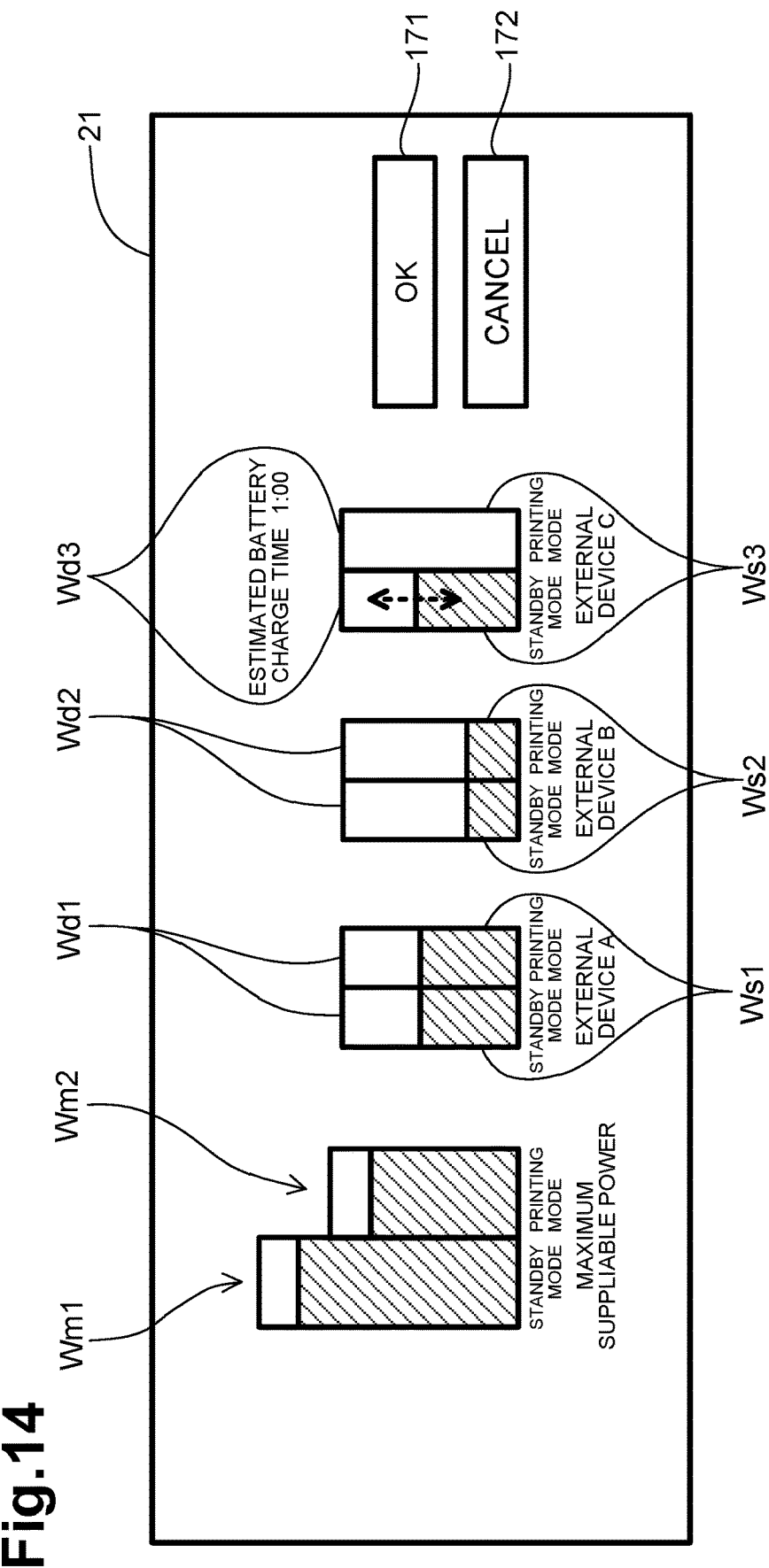
FIG. 14 depicts yet another example of a setting screen displayed in the touch panel, according to one or more aspects of the disclosure, to set a value of power to be supplied to an external device.

For example, as depicted in FIG. 14, the touch panel 21 may display graphs Wm1 and Wm2, which respectively represent the maximum suppliable power values in the standby mode and the printing mode, and sections Ws1-Ws3, which represent values of supply powers to external devices. The sections Ws1-Ws3 are displayed outside a region where the graphs Wm1 and Wm2 are displayed. In an example of FIG. 14, the touch panel 21 includes bar-graph-shaped display regions Wd1, Wd2, and Wd3, each including the sections Ws1-Ws3, respectively. The sections Ws1-Ws3 are hatched in the respective display regions Wd1-Wd3, as depicted in FIG. 14. Each of graphs Wm1 and Wm2 in FIG. 14 has a hatched portion. The length of the hatched portion of each of the bar graphs Wm1 and Wm2 in a longitudinal direction thereof (e.g., height of the graph Wm1 and Wm2) matches the sum of the lengths of the corresponding sections Ws1-Ws3 in the longitudinal direction of the sections Ws1-Ws3. In response to a user's touching a section Ws1-Ws3 of the standby mode or the printing mode and moving the touch over the surface of the touch panel 21 in the longitudinal direction of the section Ws1-Ws3, the touched section may be elongated or shortened. In response to the touched section Ws1-Ws3 elongated or shortened, the hatched portion of the corresponding graph Wm1 and Wm2 may be elongated or shortened.

Figure 15:
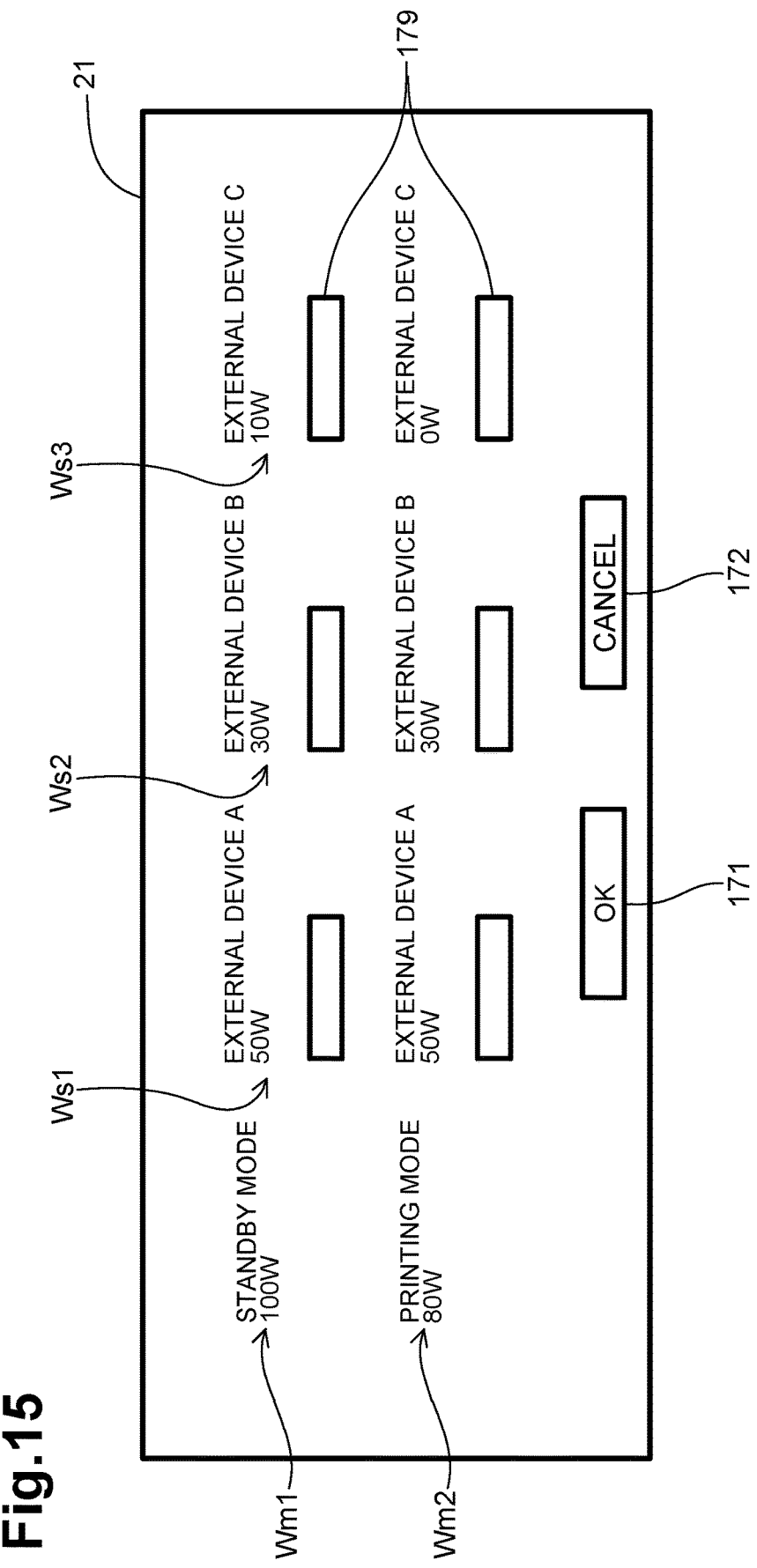
FIG. 15 depicts still another example of a setting screen displayed in the touch panel, according to one or more aspects of the disclosure, to set a value of power to be supplied to an external device.

A manner of displaying representations of the maximum suppliable power values and supplied power values in the touch panel 21 is not limited to a graphical display. For example, as depicted in FIG. 15, the CPU 12 may control the touch panel 21 to display maximum suppliable power values Wm1 and Wm2 in the standby mode and the printing mode, and values Ws1-Ws3 of powers to be supplied to external devices. The CPU 12 may control the touch panel 21 to display a text box 179 for each value Ws1-Ws3. The CPU 12 writes a numeral or a value entered in the text box 179 by a user, into the RAM 13, as a value of power to be supplied to an external device. In this configuration, the CPU 12 may control the touch panel 21 to display the notification 175 (refer to FIG. 8), or the potential error message 177 (refer to FIG. 10), according to numerals or values entered in the text box 179. For example, if a user enters a numeral of power (e.g., 150) that exceeds the maximum suppliable power value (100 W) in the text box 179 for the external device C for the standby mode and has pressed the OK button 171, the CPU 12 may control the touch panel 21 to display the notification 175 (e.g., alert or warning) in the text box 179. In association with a numeral entered in a text box 179 provided in correspondence with a respective one of the power values Ws1-Ws3, the CPU 12 may increase or decrease other values displayed in other text boxes 179.

In an illustrative embodiment, the touch panel 21 of the MFP 1 displays a setting screen for setting a value of power to be supplied to an external device. In another embodiment, for example, a display device of an external device, such as the PC 61, may display a setting screen for setting a value of power to be supplied to an external device.

In an illustrative embodiment, in response to determining that an external device is connected to the USB interface 19 after boot-up of the MFP 1, the CPU 12 may automatically request an external device to send its minimum operable power value, through the USB interface 19, and receive the minimum operable power value from the external device. In another embodiment, for example, in response to a user's operation on the user interface 20, such as the touch panel 21, the CPU 12 may determine a minimum operable power value though the user interface 20. In still another embodiment, the CPU 12 may estimate a minimum operable power value of an external device based on other information, e.g., a device class, without receiving the minimum operable power value from the external device.

In an illustrative embodiment, in response to determining that a user's touch operation on the touch panel 21 is to reduce a value of power supply to an external device that is not powered by its own power supply (S31: YES and S33: YES in FIG. 4), the CPU 12 may allow for the reduction of the value of power to be supplied to the external device and control the touch panel 21 to shorten the section representing the value of power supply to the external device. In another embodiment, the CPU 12 may disable such user's operation for reducing a value of power to be supplied to an external device that is not powered by its own power supply.

In an illustrative embodiment, in response to determining that a user's touch operation on the touch panel 21 is to reduce a value of power to be supplied to an external device that is not powered by its own power supply, the CPU 12 controls the touch panel 21 to display the potential error message 177, as depicted in FIG. 10. In another embodiment, the CPU 12 may control the touch panel 21 not to display the potential error message 177.

In an illustrative embodiment, for confirmation of a user's final decision on whether to change values of powers to be supplied to external devices, the CPU 12 controls the touch panel 21 to display the OK button 171 and the cancel button 172, and controls the touch panel 21 to receive a user's touch on the OK button 171 or the cancel button 172. In another embodiment, for example, in response to determining that user's touch on the touch panel 21 is to increase or decrease a value of power to be supplied to an external device, the CPU 12 may write the increased or decreased value into the RAM 131 as a value of power to be supplied to the external device. In this configuration, the CPU 12 may control touch panel 21 not to display the OK button 171 or the cancel button 172.

In an illustrative embodiment, in response to determining that the OK button 171 or the cancel button 172 is touched, the CPU 12 controls the touch panel 21 to cease the setting screen, as depicted in FIG. 6, for setting values of powers to be supplied to external devices (S44). In another embodiment, for example, after determining that the OK button 171 is touched, the CPU 12 may control the touch panel 21 to continue to display the setting screen, until the CPU 12 determines that a numeral key 22 is touched.

The CPU 12 may control the touch panel 21 not to display an estimated battery charge time.

The CPU 12 does not necessarily generate a power profile, or determine an estimated battery charge time based on the power profile.

The CPU 12 may be configured to control the touch panel 21 to display representations of the maximum suppliable power value in the printing mode and values of powers to be supplied to external devices in the printing mode, without displaying a representation of those values in the standby mode.

The MFP 1 may not necessarily include the touch panel 21.

The MFP 1 provides or supplies power to an external device through an interface in accordance with a predetermined specification, e.g., USB2.0. The predetermined specification is not limited to the USB2.0 specification, but may be other USB specifications, such as USB3.0 specification, USB battery charging specification, and USB Power Delivery specification. The predetermined specification is not limited to one of the USB specifications, but may be other specifications than USB specifications.

The controller configured to execute a predetermined program is not limited to the CPU 12, as in the illustrative embodiment. In another embodiment, the controller may be, for example, hardware, such as an application specific integrated circuit ("ASIC"). The controller may be a combination of software and hardware.

The power supply apparatus is not limited to a multifunctional device, e.g., the MFP 1, as in the illustrative embodiment. In another embodiment, the power supply apparatus may be a printer, a copier, a facsimile machine, a scanner, or a general-purpose or personal computer.

What is claimed is:

1. An apparatus, comprising:
a connector configured to receive power from a power supply and supply power to one or more external devices over a connection;
a touch-sensitive user interface;
a display panel;
one or more processors; and
memory storing instructions that, when executed by the one or more processors, cause the apparatus to:
control the display panel to display a representation of a maximum power that can be supplied, via the connector, to one or more external devices;
control the connector to receive a value of minimum operable power necessary to operate a first external device, wherein the minimum operable power is lower than the maximum power;
receive, via the user interface and while the representation of the maximum power is displayed in the display panel, a user-selected power value;
store, in the memory:
an external device power value corresponding to the user-selected power value; and
the value of minimum operable power;
read the external device power value stored in the memory and supply power corresponding to the read external device power value, to the first external device via the connector;
control the display panel to:
display a representation of the external device power value read from the memory; and
change a displayed representation of the external device power value in response to the user-selected power value received via the user interface;
display a button, wherein the external device power value is stored in the memory in response to a user's press operation on the button via the user interface;
determine whether the user-selected power value exceeds the maximum power; and
in response to determining that the user-selected power value exceeds the maximum power, control the display panel to display a representation of the maximum power.

2. The apparatus according to claim 1, wherein the instructions, when executed by the one or more processors, cause the apparatus to control the display panel to display a graph whose size corresponds to the external device power value read from the memory.

3. The apparatus according to claim 2, wherein the instructions, when executed by the one or more processors, cause the apparatus to:

control the display panel to display the graph as a bar graph whose length corresponds to the external device power value read from the memory;

after a user's drag operation via the user interface to elongate the bar graph, adjust the external device power value, stored in the memory, by adding a power value corresponding to an amount of dragging in the drag operation to elongate the bar graph; and after a user's drag operation via the user interface to shorten the bar graph, adjust the external device power value, stored in the memory, by subtracting a power value corresponding to an amount of dragging in the drag operation to shorten the bar graph.

4. The apparatus according to claim 2, wherein the instructions, when executed by the one or more processors, cause the apparatus to control the display panel to display a graph whose size corresponds to the maximum power, and wherein the graph whose size corresponds to the external device power value read from the memory is displayed on the graph whose size corresponds to the maximum power.

5. The apparatus according to claim 1, wherein the instructions, when executed by the one or more processors, cause the apparatus to control the display panel to display an indication that the first external device comprises a power supply.

6. The apparatus according to claim 1, wherein the instructions, when executed by the one or more processors, cause the apparatus to, in response to:

determining that the first external device does not include a power supply; and receiving a user's operation, via the user interface, to reduce the external device power value stored in the memory, control the display panel to display a warning notification.

7. The apparatus according to claim 1, wherein the instructions, when executed by the one or more processors, cause the apparatus to, in response to determining that the first external device has a battery:

determine an estimated charge time required to complete charging of the battery using power at a level of the external device power value stored in the memory; and control the display panel to display the determined estimated charge time in correspondence with a representation of the external device power value read from the memory.

8. The apparatus according to claim 7, wherein the instructions, when executed by the one or more processors, cause the apparatus to determine the estimated charge time using data representing a relationship between:

values of charging current flowing into the battery of the first external device;

capacity of the battery; and the external device power value stored in the memory.

9. The apparatus according to claim 1, wherein the instructions, when executed by the one or more processors, cause the apparatus to control the display panel to display:

a representation of a maximum power for a standby mode in which the apparatus is not performing a print operation; and a representation of a maximum power for a printing mode in which the apparatus is performing a print operation.

10. The apparatus of claim 1, wherein the apparatus is a printer.

11. The apparatus of claim 1, wherein the display panel and the connector are disposed on a casing.

12. The apparatus of claim 1, wherein the instructions, when executed by the one or more processors, cause the apparatus to:

control the display panel to display the representation of the maximum power as a graph; and adjust external device power values for the first external device and a second external device in response to a user drag input.

* * * * *